United States Patent
Fang et al.

(10) Patent No.: US 12,108,465 B2
(45) Date of Patent: Oct. 1, 2024

(54) MULTI-LINK WIRELESS COMMUNICATION NETWORKS FOR HIGH PRIORITY/LOW LATENCY SERVICES

(71) Applicant: ZTE Corporation, Guangdong (CN)

(72) Inventors: Yonggang Fang, Guangdong (CN); Bo Sun, Guangdong (CN); Zhiqiang Han, Guangdong (CN)

(73) Assignee: ZTE Corporation, Guangdong (CN)

( * ) Notice: Subject to any disclaimer, the term of this patent is extended or adjusted under 35 U.S.C. 154(b) by 369 days.

(21) Appl. No.: 17/647,567

(22) Filed: Jan. 10, 2022

(65) Prior Publication Data

US 2022/0159718 A1    May 19, 2022

Related U.S. Application Data

(63) Continuation of application No. PCT/CN2020/078991, filed on Mar. 12, 2020.

(30) Foreign Application Priority Data

Jul. 10, 2019   (WO) ................ PCT/CN2019/095428

(51) Int. Cl.
*H04W 74/0833* (2024.01)
*H04W 74/0808* (2024.01)
(Continued)

(52) U.S. Cl.
CPC ..... *H04W 74/085* (2013.01); *H04W 74/0808* (2013.01); *H04W 76/15* (2018.02); *H04W 80/02* (2013.01)

(58) Field of Classification Search
CPC ............... H04W 74/085; H04W 76/15; H04W 74/0808; H04W 80/02; H04W 48/12; H04W 84/12; H04W 88/08; H04W 16/14
See application file for complete search history.

(56) References Cited

U.S. PATENT DOCUMENTS

2011/0235513 A1*  9/2011  Ali ...................... H04L 47/6215
                                                                 370/232
2012/0120892 A1   5/2012  Freda et al.
(Continued)

FOREIGN PATENT DOCUMENTS

CN       103081421 A     5/2013
CN       103222311 A     7/2013
(Continued)

OTHER PUBLICATIONS

Co-Pending EP Application No. 20836839.9 Extended Search Report, dated Sep. 22, 2022, 11 pages.
(Continued)

*Primary Examiner* — Mandish K Randhawa
(74) *Attorney, Agent, or Firm* — Perkins Coie LLP

(57) ABSTRACT

The present document discloses methods, systems, and devices related to digital wireless communications, and more specifically, to techniques related to utilizing the multi-link channel assessment mechanism and multi-link channel access to reduce the access delay, improve transmission reliability, and increase transmission throughput. In one exemplary aspect, a method for wireless communication includes identifying, by a radio node, a first priority indicator associated with a data packet. The method also includes, responsive to identifying the first priority indicator associated with the data packet, transmitting, by the radio node, the data packet on a first available link detected via a multi-link clear channel assessment, the transmission of the data packet being prioritized to occur before transmission of another data packet that does not include the first priority indicator.

18 Claims, 18 Drawing Sheets

(51) Int. Cl.
*H04W 76/15* (2018.01)
*H04W 80/02* (2009.01)

(56) References Cited

U.S. PATENT DOCUMENTS

| | | | |
|---|---|---|---|
| 2015/0098397 | A1 | 4/2015 | Damnjanovic et al. |
| 2016/0212625 | A1 | 7/2016 | Damnjanovic et al. |
| 2016/0316470 | A1* | 10/2016 | Wong ............... H04W 72/0453 |
| 2016/0316474 | A1 | 10/2016 | Merlin et al. |
| 2017/0006542 | A1 | 1/2017 | Huang et al. |
| 2017/0055290 | A1 | 2/2017 | Lv et al. |
| 2017/0064739 | A1 | 3/2017 | Hedayat et al. |
| 2018/0176954 | A1 | 6/2018 | Singh et al. |
| 2018/0206190 | A1 | 7/2018 | Cherian et al. |
| 2018/0206284 | A1 | 7/2018 | Zhou et al. |
| 2019/0082373 | A1 | 3/2019 | Patil et al. |
| 2019/0082463 | A1 | 3/2019 | Patil et al. |
| 2019/0116546 | A1 | 4/2019 | Kang et al. |
| 2019/0150214 | A1 | 5/2019 | Zhou et al. |
| 2019/0335454 | A1 | 10/2019 | Huang et al. |
| 2019/0364555 | A1* | 11/2019 | Huang ............... H04W 72/51 |
| 2020/0029324 | A1* | 1/2020 | Nezou ............... H04W 74/0833 |
| 2020/0322889 | A1 | 10/2020 | Chitrakar et al. |
| 2021/0007168 | A1 | 1/2021 | Asterjadhi et al. |
| 2021/0227547 | A1 | 7/2021 | Chitrakar et al. |
| 2021/0243749 | A1* | 8/2021 | Hoang ............... H04W 72/02 |
| 2021/0345134 | A1 | 11/2021 | Ottersten et al. |
| 2021/0360522 | A1 | 11/2021 | Chitrakar et al. |
| 2022/0086098 | A1 | 3/2022 | Huang et al. |
| 2023/0379999 | A1 | 11/2023 | Kim et al. |

FOREIGN PATENT DOCUMENTS

| | | |
|---|---|---|
| CN | 107548569 A | 1/2018 |
| CN | 107852299 A | 3/2018 |
| CN | 104349405 | 1/2019 |
| CN | 112188640 | 1/2021 |
| JP | 09289684 | 4/1997 |
| SG | 10201809503 R | 10/2018 |
| WO | 2018/121347 | 7/2018 |
| WO | 2018/136513 | 7/2018 |
| WO | 2018/136516 | 7/2018 |
| WO | 2019/006085 A1 | 1/2019 |
| WO | 2019/099268 | 5/2019 |
| WO | 2019/132607 | 7/2019 |
| WO | 2020/33381 | 2/2020 |
| WO | 2021/182902 | 9/2021 |
| WO | 2021/182902 A1 | 9/2021 |

OTHER PUBLICATIONS

Naribole et al., "Multi-Link Operation Channel Access Discussion", IEEE Draft, vol. 802.11 EHT; 802.llbe, No. 2, Oct. 31, 2019, pp. 1-19. Retrieved from the Internet: URL: https://mentor.ieee.org/802.11/dcn/19/11-19-1405-02-00be-multi-link-operation-channel-access-discussion.pptx.

Fang et al., "Multi-link channel access for non-STR MLD," IEEE Draft, vol. 802.11 EHT; 802.llbe, Aug. 25, 2020, pp. 1-17. Retrieved from the Internet: URL: https://mentor.ieee.org/802.11/dcn/20/11-20-1221-00-00be-multi-link-channel-access-for-non-str-mld.pptx.

Co-Pending EP Application No. 20924271.8, Extended European Search Report dated May 23, 2023, 13 pages.

Qualcomm, "MLO: Sync PPDUs", IEEE Draft; 11-20-0026-00-00BE-MLO-SYNC-PPDUS, IEEE-SA Mentor, Piscataway, NJ USA vol. 802.11 EHT; 802.llbe, Jan. 13, 2020 10 pages.

Samsung "Multi-link Channel Access Follow-up", vol. 802.11 EHT; 802.11be, No. 4, EEE-SA Mentor, Piscataway, NJ USA, Jan. 21, 2020 21 pages.

Broadcom, Inc. "MLO-Synch-Transmission", IEEE Draft; IEEE-SA Mentor, Piscataway, NJ USA, vol. 802.11 EHT; 802.11be, No. 1, Jan. 21, 2020, 59 pages.

Co-Pending EP Application No. 19936862.2 Extended Search Report, dated Jun. 21, 2022 9 pages.

Intel Corp "Low latency service in 802. 11be" vol. 802.11 EHT; 802.11be, Mar. 10, 2020, 13 pages.

Fang et al. "Channel Access Category" 11-20-0468-00-00BE-Channel-Access-Category, IEEE-SA Mentor, Piscataway, NJ USA, vol. 802.11 EHT; 802.11be, Mar. 16, 2020, 12 pages.

Subir Das (PL): "Priority Access Support for NS/EP Services", IEEE Draft; 11-20-0021-01-00-BE-Priority-Access-Support-for-NS-EP-Services, IEEE-SA Mentor, Piscataway, NJ USA, vol. 802.11 EHT; 802.11be, No. 1, Jan. 14, 2020, 15 pages.

Co-Pending EP Application No. 2083734.6 Extended Search Report, dated Sep. 26, 2022 10 pages.

USPTO, Non-Final Office Action for U.S. Appl. No. 17/647,563, mailed on Feb. 1, 2024, 17 pages.

USPTO, Non-Final Office Action for U.S. Appl. No. 17/572,316, mailed on Feb. 28, 2024, 56 pages.

USPTO, Final Office Action for U.S. Appl. No. 17/647,563, mailed on Apr. 8, 2024, 18 pages.

Co-Pending U.S. Appl. No. 17/647,569, Non-Final Office Action dated May 7, 2024, 25 pages.

International Search Report and Written Opinion for PCT/CN2020/078991, dated May 15, 2020 10 pages.

Huawei, et al. "Coexistence and channel access for NR-based unlicensed band operation," 3GPP TSG RAN WG1 NR Ad Hoc Meeting R1-1711467, Qingdao, China, Jun. 27-30, 2017, 5 pages.

CIPO, First Office Action for Chinese Application No. 2019800983564, mailed on May 29, 2024, 31 pages with unofficial English translation.

CIPO, First Office Action for Chinese Application No. 202080098359.0, mailed on Jun. 19, 2024, 47 pages with unofficial English translation.

USPTO, Notice of Allowance for U.S. Appl. No. 17/647,569, mailed on Jul. 17, 2024, 11 pages.

* cited by examiner

| User Priority | Description |
|---|---|
| 0-7 | Use Priority of an MSDU |
| 8 | The AC value of an MPDU is AC-VO (voice) |
| 9 | The AC value of an MPDU is AC-VI (video) |
| 10 | The AC value of an MPDU is AC-BE (best effort) |
| 11 | The AC value of an MPDU is AC-BG (background) |
| <u>12</u> | <u>User Priority value of an MSDU which can be mapped to any AC value of an MPDU for high priority/low latency (HP/LL) service, i.e., it allows to use the channel access with any AC which comes earliest for HP/LL transmission.</u> |
| 13-254 | Reserved |
| 255 | The User Priority field is not used for comparison |

| Priority | UP (Same as IEEE802.1D Priority) | IEEE802.1D | AC | Transmit queue (dot11Alternate-EDCAActivated false or not present) | Transmit queue (dot11Alternate EDCAActivated true) | Designation |
|---|---|---|---|---|---|---|
| Lowest | 1 | BK | AC_BK | BK | BK | Background |
| | 2 | - | AC_BK | BK | BK | Background |
| | 0 | BE | AC_BE | BE | BE | Best Effort |
| | 3 | EE | AC_BE | BE | BE | Best Effort |
| | 4 | CL | AC_VI | VI | A_VI | Video (alternate) |
| | 5 | VI | AC_VI | VI | VI | Video (primary) |
| | 6 | VO | AC_VO | VO | VO | Voice (primary) |
| | 7 | NC | AC_VO | VO | A_VO | Voice (alternate) |
| Highest | 12 (not same as IEEE802.1D Priority) | | AC_ANY | ANY | ANY | (high priority and low latency) |

| Priority | UP (Same as IEEE802.1D Priority) | IEEE802.1D | AC | Transmit queue (dot11Alternate-EDCAActivated false or not present) | Transmit queue (dot11Alternate EDCAActivated true) | Designation |
|---|---|---|---|---|---|---|
| Lowest | 1 | BK | AC_BK | BK | BK | Background |
| ↓ | 2 | - | AC_BK | BK | BK | Background |
|  | 0 | BE | AC_BE | BE | BE | Best Effort |
|  | 4 | CL | AC_VI | VI | A_VI | Video (alternate) |
|  | 5 | VI | AC_VI | VI | VI | Video (primary) |
|  | 6 | VO | AC_VO | VO | VO | Voice (primary) |
|  | 7 | NC | AC_VO | VO | A_VO | Voice (alternate) |
| Highest | <u>3</u> | | <u>AC_ANY</u> | <u>ANY</u> | <u>ANY</u> | <u>High Priority/Low Latency</u> |

FIG. 3C

| Priority | UP (Same as IEEE802.1D Priority) | IEEE802.1D | AC | Transmit queue (dot11Alternate-EDCAActivated false or not present) | Transmit queue (dot11Alternate EDCAActivated true) | Designation |
|---|---|---|---|---|---|---|
| Lowest | 1 | BK | AC_BK | BK | BK | Background |
| | 2 | - | AC_BK | BK | BK | Background |
| | 0 | BE | AC_BE | BE | BE | Best Effort |
| | 4 | CL | AC_VI | VI | A_VI | Video (alternate) |
| | 5 | VI | AC_VI | VI | VI | Video (primary) |
| | 6 | VO | AC_VO | VO | VO | Voice (primary) |
| | 7 | NC | AC_VO | VO | A_VO | Voice (alternate) |
| Highest | 3 | | AC_HP/LL | HP/LL | HP/LL | High Priority/Low Latency |

FIG. 3D

MULTI-LINK WIRELESS COMMUNICATION NETWORKS FOR HIGH PRIORITY/LOW LATENCY SERVICES

CROSS REFERENCE TO RELATED APPLICATIONS

This patent document is a continuation of PCT/CN2020/078991, filed Mar. 12, 2020 which claims the benefit of priority under 35 U.S.C. § 119(a) and the Paris Convention of International Patent Application No. PCT/CN2019/095428, filed on Jul. 10, 2019. The entire contents of the before-mentioned patent applications are incorporated by reference as part of the disclosure of this application.

TECHNICAL FIELD

This patent document is directed generally to wireless communications.

BACKGROUND

Wireless communication technologies are moving the world toward an increasingly networked society. In many user cases and deployment scenarios like factory automations, gaming, Artificial Intelligence (AI), Virtual Reality (VR), Augmented Reality (AR), etc., it can require the rapid growth of wireless communications to provide low latency connections for such application services.

Wireless communication systems can include a network of one or more access points (APs) that communicate with one or more wireless stations (STAs). An AP may emit radio signals that carry management information, control information or user data to one or more STAs. A STA may transmit radio signals to an AP in the same frequency channel using a technique such as time division duplexing (TDD) or in a different frequency using a technique such as frequency division duplexing (FDD).

The Institute of Electrical and Electronics Engineers (IEEE) 802.11 specifies a specification for a wireless local area network (WLAN) over radio channels in license-exempt bands. The basic unit of a WLAN is a basic service set (BSS). An infrastructure BSS may include the BSS with stations through associating with an Access Point (AP) to connect to the wired network or Internet. In an infrastructure BSS, both an access point and a station may share the same frequency channel via using Carrier Sensing Multiple Access with Collision Avoidance (CSMA/CA) technology, a kind of TDD mechanism, for multiple access and data transmission.

SUMMARY

This document discloses methods, systems, and devices related to digital wireless communications, and more specifically, to techniques related to utilizing the multi-link channel assessment mechanism and multi-link channel access to reduce the access delay, improve transmission reliability, and increase transmission throughput.

In one exemplary aspect, a method for wireless communication includes identifying, by a radio node, a first priority indicator associated with a data packet. The method also includes, responsive to identifying the first priority indicator associated with the data packet, transmitting, by the radio node, the data packet on a first available link detected via a multi-link clear channel assessment, the transmission of the data packet being prioritized to occur before transmission of another data packet that does not include the first priority indicator.

In another exemplary aspect, a wireless communications apparatus comprising a processor is disclosed. The processor is configured to implement a method described herein.

In yet another exemplary aspect, the various techniques described herein may be embodied as processor-executable code and stored on a computer-readable program medium.

Some embodiments may preferably implement the following solutions, written in a clause-format.

1. A solution for wireless communication, comprising: identifying, by a radio node, a first priority indicator associated with a data packet; and responsive to identifying the first priority indicator associated with the data packet, transmitting, by the radio node, the data packet on a first available link detected via a multi-link clear channel assessment, the transmission of the data packet being prioritized to occur before transmission of another data packet that does not include the first priority indicator.
2. The solution of clause 1, wherein the multi-link clear channel assessment includes: inspecting, by the radio node, a multi-link network allocation vector (ML-NAV) value for each link of the multiple links to determine whether the first available link is available for transmission of the data packet; and responsive to determining that the first available link is available for transmission of the data packet, initiating, by the radio node, a back off counter for the first available link, wherein the data packet is transmitted responsive to determining that the back off counter has expired.
3. The solution of clause 1, wherein the first priority indicator is associated with a user priority associated with a first priority service.
4. The solution of clause 3, wherein the first priority service allows the radio node to utilize any access category virtually with an earliest availability via a multi-link assessment, wherein the data packet includes a data frame including a high priority and low latency media access control (MAC) protocol data unit (MPDU).
5. The solution of clause 4, wherein the user priority associated with the first priority service includes a user priority value of 12.
6. The solution of clause 4, wherein the user priority associated with the first priority service includes a user priority value of 3 that corresponds to a virtual access category relating to any channel access or a high priority channel access.
7. The solution of any of clauses 3, 4, and 6, further comprising: mapping, by the radio node, the user priority associated with the first priority service to a corresponding first access category for multi-link channel access.
8. The solution of clause 1, further comprising: obtaining, by the radio node, an extremely high throughput (EHT) message that includes the first priority indicator, wherein the first priority indicator is included within a universal signal portion of the EHT message.
9. The solution of any of clauses 1 and 3, further comprising: for each link of the multiple links of the radio node, determining, by the radio node, that a first link is in an idle state; responsive to determining that the first link is in the idle state, starting, by the radio node, a back off counter associated with an access category relating to the first priority indicator; and responsive to determining that the back off counter has expired, transmitting, by the radio node, the data packet over the first link, the data packet including a MAC protocol data unit (MPDU) with the user priority associated with the first priority service.

10. The solution of clause 9, wherein determining that the first link is in the idle state includes performing a clear channel assessment of the multiple links of the radio node.

11. The solution of clause 1, further comprising: receiving, by the radio node, a first message that includes the first priority indicator at a first time; determining, by the radio node, that a first link and a second link is in an idle state at a second time; starting, by the radio node, an independent back off counter for each of the first link and second link responsive to determining that each of the first link and the second link is in the idle state; and responsive to each independent back off counter expiring, transmitting, by the radio node, at least a portion of the data packet over each of the first link and second link.

12. The solution of clause 1, further comprising: receiving, by the radio node, a first message that includes the first priority indicator at a first time; determining, by the radio node, that a first link and a second link is in an idle state at a second time; starting, by the radio node, a back off counter common to each of the first link and second link responsive to determining that each of the first link and the second link is in the idle state; and responsive to determining that the back off counter has expired, transmitting, by the radio node, at least a portion of the data packet over each of the first link and second link.

13. The solution of clause 1, further comprising: receiving, by the radio node, a first message that includes the first priority indicator at a first time; determining, by the radio node, whether each link of the multiple links includes a signal strength measurement that is less than an overlapping basis service set preamble detection threshold; responsive to determining that each of a first link and a second link of the multiple links includes signal strength measurements that are less than the overlapping basis service set preamble detection threshold, starting, by the radio node, a back off counter common to each of the first link and second link; and responsive to determining that the back off counter has expired, transmitting, by the radio node, at least a portion of the data packet over each of the first link and second link, wherein any other communication over the first link and second link are preempted by the data packet.

14. The solution of clause 13, wherein said transmitting at least the portion of the data packet over each of the first link and second link includes transmitting the data packet with a signal strength that is greater than a signal strength of overlapping basic service set (OBSS) data transmitted over the first link and second link.

15. The solution of clause 1, further comprising: receiving, by the radio node, a first message that includes the first priority indicator at a first time; determining, by the radio node, that all links of the multiple links are in an idle state at a second time, wherein a clear channel assessment of the multiple links is not performed until determining that all links of the multiple links are in the idle state at the second time; starting, by the radio node, an individual back off counter for each of the first link and second link; and responsive to determining that the individual back off counters have expired at a third time, transmitting, by the radio node, at least a portion of the data packet over each of the first link and second link.

16. The solution of clause 1, further comprising: receiving, by the radio node, a first message that includes the first priority indicator at a first time; determining, by the radio node, that a first link is in an idle state at a second time; starting, by the radio node, a first back off counter for the first link; determining, by the radio node, that a first link is still in the idle state at third time; starting, by the radio node, a second back off counter for the second link; and responsive to expiry of the first back off counter and the second back off counter and determining that all links are in the idle state at a fourth time, transmitting, by the radio node, at least a portion of the data packet over each of the first link and second link.

17. The solution of clause 1, further comprising: receiving, by the radio node, a first message that includes the first priority indicator at a first time; determining, by the radio node, that a first link is in an idle state at a second time; starting, by the radio node, a first back off counter for the first link; transmitting, by the radio node, the data packet over the first link, wherein the transmission of the data packet over the first link preempts a transmission over a second link.

18. The solution of clause 1, further comprising: receiving, by the radio node, a first message that includes the first priority indicator at a first time; determining, by the radio node, that a first link of the multiple links includes a signal strength measurement that is less than an overlapping basis service set preamble detection threshold and that a third link is greater than the overlapping basis service set preamble detection threshold; determining, by the radio node, that a second link includes data traffic that does not include any high priority low latency indicators; starting, by the radio node, a first back off counter for the first link and a second back off counter for the second link; and responsive to determining that the first and second back off counters have expired, transmitting, by the radio node, at least a portion of the data packet over each of the first link and second link.

19. The solution of clause 18, wherein said transmitting at least the portion of the data packet over each of the first link and second link includes transmitting the data packet with a signal strength that is greater than a signal strength of OBSS data transmitted over the first link and second link.

20. An apparatus for wireless communication comprising a processor that is configured to carry out the solution of any of clauses 1 to 20.

21. A non-transitory computer readable medium having code stored thereon, the code when executed by a processor, causing the processor to implement a solution recited in any of clauses 1 to 19.

The details of one or more implementations are set forth in the accompanying attachments, the drawings, and the description below. Other features will be apparent from the description and drawings, and from the clauses.

BRIEF DESCRIPTION OF THE DRAWINGS

FIG. 3A illustrates an example user priority of a MSDU and corresponding mapping tables to access categories of a MPDU, according to a first embodiment.

FIG. 3B illustrates an example user priority of a MSDU and corresponding mapping tables to access categories of a MPDU, according to a second embodiment.

FIG. 3C illustrates an example user priority of a MSDU and corresponding mapping tables to access categories of a MPDU, according to a third embodiment.

FIG. 3D illustrates an example user priority of a MSDU and corresponding mapping tables to access categories of a MPDU, according to a fourth embodiment.

DETAILED DESCRIPTION

Figure 1:
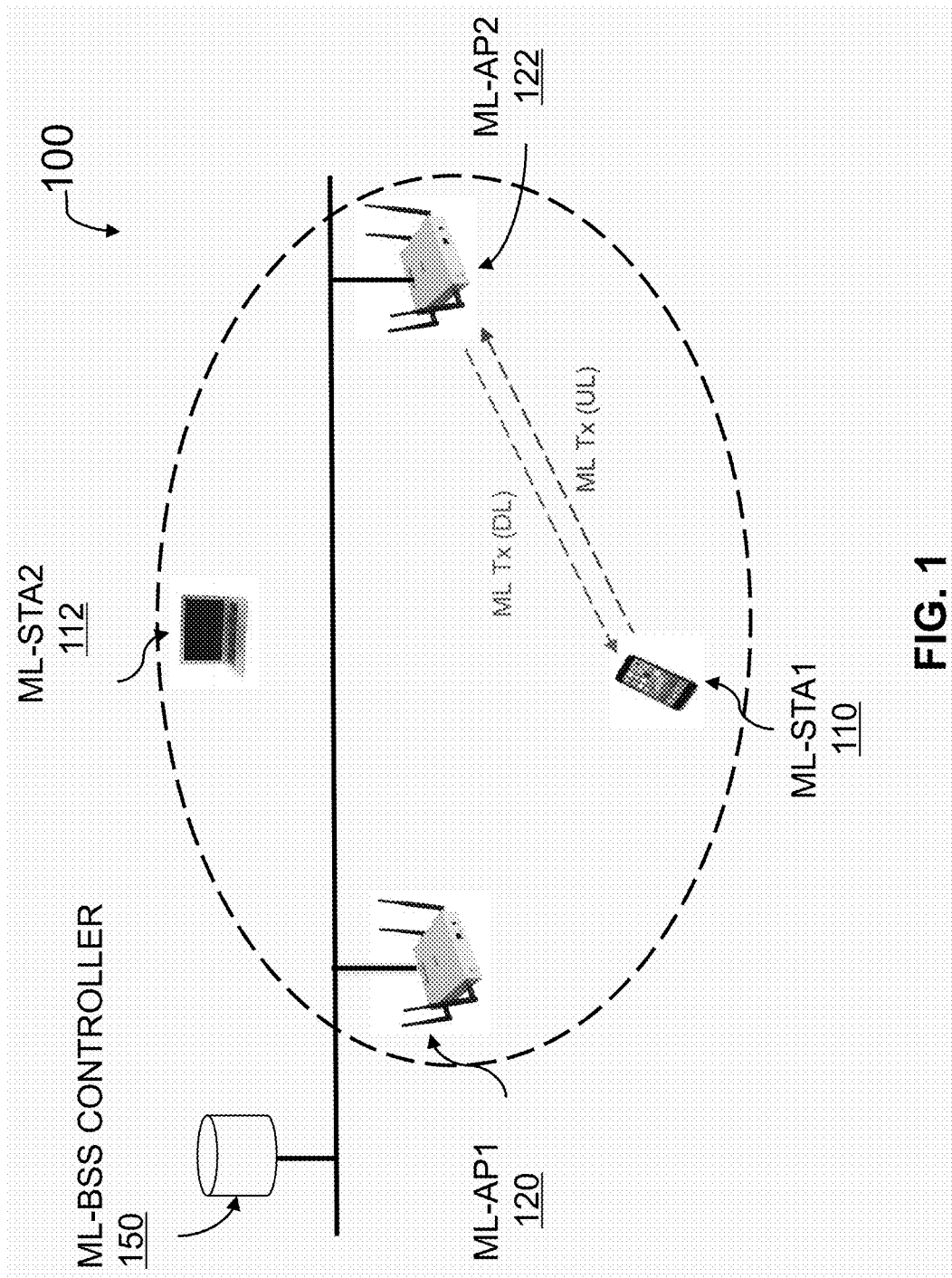
FIG. 1 illustrates an example multi-link access network.

Section headings are used in the present document only for ease of understanding and do not limit scope of the embodiments to the section in which they are described. Furthermore, while embodiments are described with reference to wireless local access network (WLAN) examples, the disclosed techniques may be applied to wireless systems that use protocols other than WLAN or IEEE802.11 protocols.

Wireless local area communication is fast becoming a popular mechanism to communicate with each other directly or via a network such as the internet. Multiple wireless devices (e.g., smartphones, tablets, etc.) may attempt to transmit and receive data on a shared communication spectrum in an environment (e.g., airport, homes, buildings, sports venues, etc.). Additionally, wireless devices (e.g., sensors, cameras, control units, etc.) are increasingly utilized in networks for various applications (e.g., factory automations, vehicle communications etc.).

In some cases, transmission of data is based on an air interface as specified by the Institute of Electrical and Electronics Engineers (IEEE), standard 802.11 series. In this specification, devices may share a wireless medium that include a certain set of rules. In IEEE 802.11, the basic service set (BSS) is a building block of a Wireless Local Area Network (WLAN). Wireless stations (also called stations) associated in the radio coverage area may establish a BSS and provide the basic service of a WLAN.

IEEE 802.11 specifies wireless access protocols for operation on a license exempt and/or shared spectrum. A wireless station can operate on a channel in license exempt frequency band (e.g., 2.4 GHz or 5 GHz), or shared frequency band with other services (e.g., 6 GHz).

When operating on a license exempt or shared spectrum, transmission and reception of wireless messages may be unreliable due to interference from other stations located within the same coverage area, such as hidden node transmissions or "visible" nodes attempting to utilize the same shared communication medium for transmissions.

The device operated on the unlicensed frequency band can utilize a carrier sensing multiple access with collision avoidance (CSMA/CA) mechanism to control the multiple medium access based on IEEE802.11 specification. Each station may implement a CSMA/CA function. Before access to the wireless medium, the station can sense the medium occupancy using CSMA/CA. If the station determines that the medium is busy, it can wait and retry sensing the medium at a later time. If the station senses the medium in idle, the station may wait for some inter frame space (IFS) and then enter the contention window (CW). In order to support multiple stations to access to the medium, each station may back off a random time before transmitting over the medium to reduce the collision and distribute the medium access evenly. The back off time may be defined as:

$$\text{back off Time} = \text{Random}(\ ) \times a\text{SlotTime} \quad \text{Eq. (1)}$$

Where Random ( )=Pseudo random integer uniformly distributed over the interval [0, CW], and CW is an integer:

$$a\text{CWmin} \leq \text{CW} \leq a\text{CWmax} \quad \text{Eq. (2)}$$

The current CSMA/CA mechanism specified in IEEE 802.11 standard may create a significant channel access delay in each transmission and causes an issue of medium utilization efficiency. When a large number of stations share the same medium and are going to transmit simultaneously, the CSMA/CA mechanism suffers on unreliable transmissions (e.g., more transmission packet loss, longer access delay, and larger jittering in an unstable radio environment). Such unreliable transmissions may decrease user experience and limit the performance of applications that require low latency and high reliability over an IEEE802.11 wireless access network.

In some cases, IEEE802.11 standards allow for one station to associate with one access point over one wireless link. This can cause a difficulty for the station to receive a reliable transmission when the associated wireless link is congested or interfered, ether at the station side or the access point side. In other cases, this restriction in IEEE802.11 standards limit wireless communication between the station and the access point if the associated wireless link is busy.

The present embodiments can relate to techniques of multi-link (ML) clear channel assessment (CCA) mechanisms to reduce the channel access latency, improve transmission reliability, and increase transmission throughput in WLANs.

FIG. 1 illustrates an example WLAN with infrastructure BSS configuration. The infrastructure BSS WLAN may include multiple ML stations (i.e., ML-STAs or non-AP ML devices), e.g., ML-STA1 110 and ML-STA2 112. A station may be in the coverage of a first ML access point (i.e. ML-AP or AP ML device), i.e., ML-AP1 120 and/or a second ML access point (i.e. ML-APs or AP ML devices), i.e., ML-AP2 122. A ML-AP1 120 can form an infrastructure ML-BSS1 and a ML-AP2 122 forms an infrastructure ML-BSS2. A ML-AP1 120 and a ML-AP2 122 may be interconnected via a switch through a distribution system (DS) to form a ML-BSS 100. A ML-AP1 120 and a ML-AP2 122 may be coordinated via a ML-BSS controller 150 for ML operation across multiple access points.

In some embodiments, a ML-STA (e.g., ML-STA1 110) with multiple radios can establish and operate multiple channels (or OFDMA sub-channels) in the same frequency band or different bands to communication with a ML-AP (e.g., ML-AP1 122). A ML-STA can associate with one or more ML-APs in the ML-BSS coverage to establish ML communication.

In some embodiments, a ML-AP 122 and a ML-STA 110 can leverage ML operation for a simultaneous transmission and reception (STR), a joint or a selective transmission over one or multiple radio frequency channels to reduce the access latency, improve the transmission reliability and/or increase the transmission throughput under the coordination of a ML-MBSS Controller 150. A ML communication may include bi-directional transmission between a ML-STA and a ML-AP through a part or all ML-links.

A joint ML communication can refer to the operation that one or more ML devices (either non-AP ML devices or AP ML devices) transmit the same packet over MLs concurrently or receive the same packet over MLs concurrently. The ML device may combine the received signals in the baseband to improve the signal-to-noise-ratio (SINR) of received signals for increasing the reliability of transmissions or select the best signal from the multiple received signals in the MAC layer.

A selective ML communication can refer to the operation that a ML device (either non-AP ML device or AP ML device) selectively transmits a packet over one or more MLs. It may be used by the ML-STA or ML-AP to reduce the access latency via selecting the first available link among ML.

A simplex (i.e. non-simultaneous transmission and reception) ML communication can refer to the operation that a ML device (either non-AP ML device or AP ML device) can concurrently transmit packets over MLs, or concurrently receives packets over MLs, but cannot concurrently transmit and receive packets.

A duplex (i.e. simultaneous transmission and reception) ML communication can refer to the operation that a ML device (either non-AP ML device or AP ML device) can concurrently transmit and receive packets over MLs.

Figure 2A:
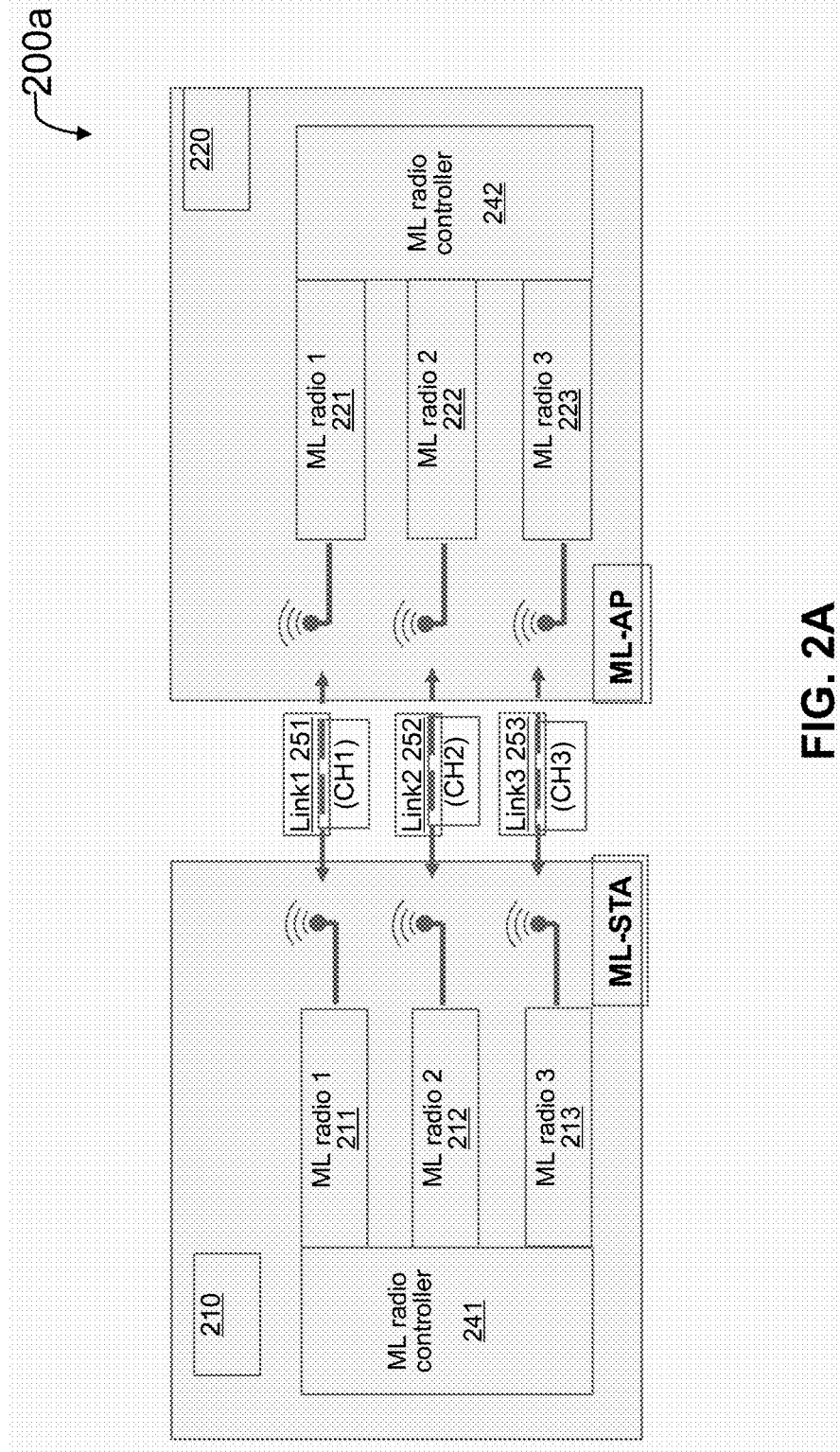
FIG. 2A illustrates an example reference architecture of a multi-link station and a multi-link access point, according to a first embodiment.
Figure 2B:
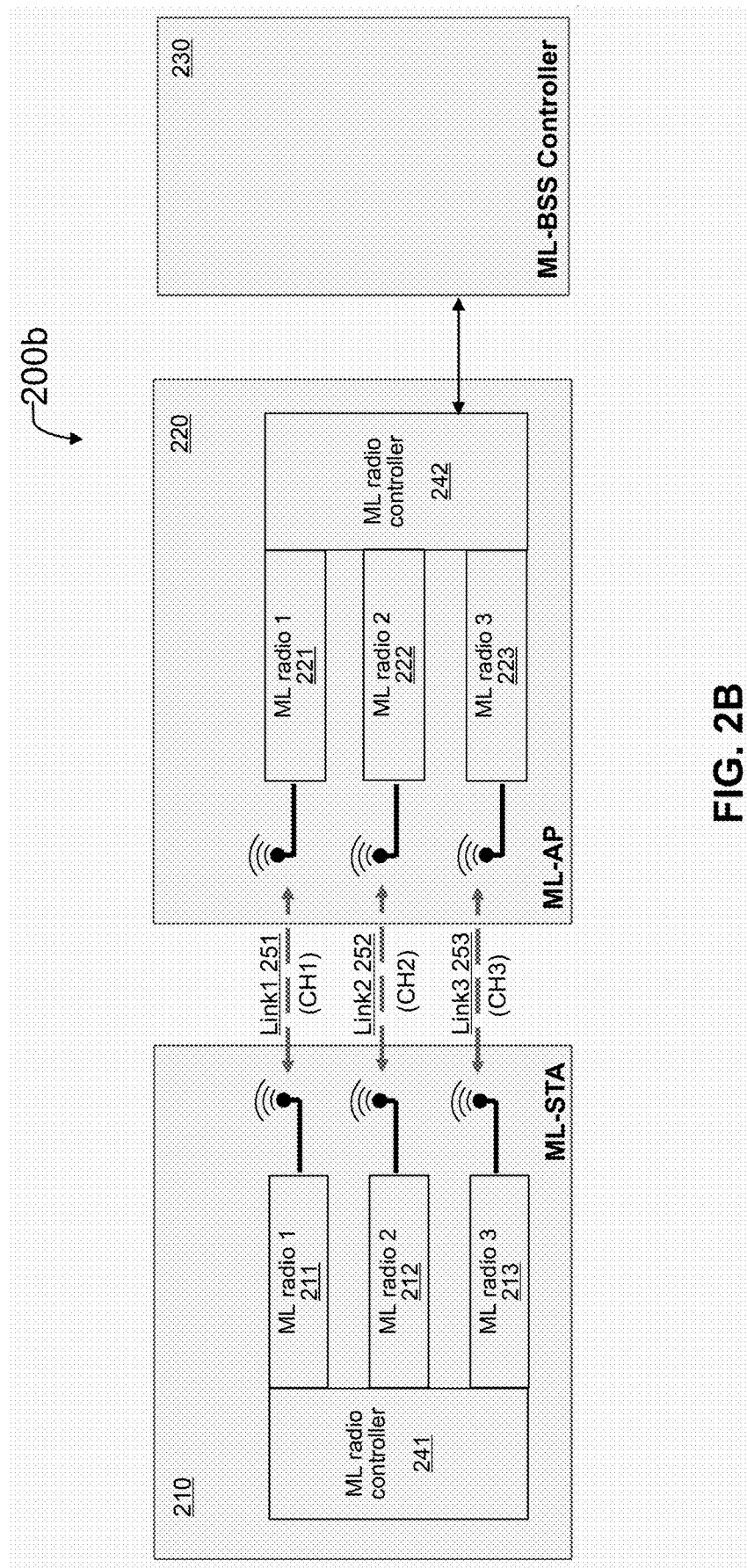
FIG. 2B illustrates an example reference architecture of a multi-link station and a multi-link access point, according to a second embodiment.

FIGS. 2A-2B illustrate examples ML system architectures for ML station (i.e. non-AP ML device) and ML access point (i.e. AP ML device). In the first embodiment as shown in FIG. 2A, the ML system 200a can include a ML-STA 210 and a ML-AP 220.

As shown in FIG. 2A, a ML-STA 210 can include ML radios 211, 212 and 213. Each radio of ML-STA 210 may include an 802.11 PHY and a partial MAC (i.e., a lower MAC (MAC-L)). A ML radio 211 may operate on a wireless channel (CH1) to establish a radio link 251 to a ML-AP 220. Similarly, a ML radio 212 and 213 may operate on wireless channels (CH3) respectively to establish radio link2 252 and link3 253 to a ML-AP 220. A ML-STA 210 may include a ML radio controller 241 which may consist of a common 802.11 MAC (i.e., upper MAC (MAC-U)) and a management entity which manages the ML operation of ML-STA 210.

The ML-AP 220 may include ML radios 221, 222 and 223. Each radio of ML-AP 220 may include an 802.11 PHY and a partial MAC (i.e., MAC-L). A radio 221 of ML-AP 220 may operate on a wireless channel (CH1) to establish a radio link 251 to the ML-STA 210. Similarly, ML radios 222 and 223 of ML-AP may operate on wireless channels (CH2 and CH3) respectively to establish radio link2 252 and link3 253 to ML-STA 210. The ML-AP 220 may have a ML radio controller 241 which may consist of a common 802.11 MAC (i.e. MAC-U) and a management entity for managing the ML operation of ML-AP 220.

In the second embodiment as shown in FIG. 2B, the ML system 200b may include a ML-STA 210, a ML-AP 220 and a ML-BSS controller 230.

As shown in FIG. 2B, the ML-STA 210 can include ML radios 211, 212 and 213. Each radio of ML-STA 210 may include an 802.11 PHY and a partial MAC (i.e., MAC-L). A radio 211 may operate on a wireless channel (CH1) to establish a radio link1 231 to a ML-AP 220. Similarly, ML radios 212 and 213 may operate on wireless channels (CH2 and CH3) respectively to establish radio link2 252 and link3 253 to a ML-AP 220. A ML-STA 210 may have a ML radio controller 241, which can consist of a common 802.11 MAC (MAC-U) and a management entity for managing the ML operation of ML-STA 210.

A ML-AP 220 may include ML radios 221, 222 and 223. Each radio of ML-AP 220 may include an 802.11 PHY and a partial MAC, i.e. MAC-L. A ML radio 221 may operate on a wireless channel (CH1) to establish a radio link 251 to the ML-STA 210. Similarly, ML radios 222 and 223 may operate on wireless channels (CH2 and CH3) respectively to establish radio link2 252 and link3 253 to a ML-STA 210.

The ML-BSS controller 230, which can be integrated with a ML-AP 220 or located separately as an individual network entity, may coordinate one or more ML radio controller 242 for ML operation.

The ML 251, 252 and 253 may include wireless protocol links that can operate on radio channels in the same frequency band or different frequency bands, such as at a 2.4 GHz, 5 GHz, 6 GHz band, etc. The links can have the same channel bandwidth, such as 20 MHz, 40 MHz, 80 MHz, 160 MHz, etc. Alternatively, the links may allow different channel bandwidth combinations, such as 160 MHz+160 MHz+20 MHz, or 160 MHz+80 MHz+20 MHz, etc.

A ML-STA may associate with a ML-AP over any link to establish ML communication between them. During the ML association, a ML-STA and a ML-AP can exchange the ML capability information and determine the supported ML operation.

A ML-STA may turn on a radio to listen to the transmissions in the unlicensed frequency band and search for Beacon frames. A ML-STA may turn on multiple ML-radios for fast searching over multiple channels simultaneously to reduce the searching time. If the ML-STA acquires a ML Beacon frame, the ML-STA may need to determine whether it can associate with this ML-AP.

A ML device (either ML-STA or ML-AP) may set the user priority of traffic class in a MSDU during the traffic stream establishment. For example, when a high priority application needs to transmit a packet, it can specify its traffic type in a matter of DSCP to the QoS in the network-layer. When a ML-STA is invoked by the network-layer, the network-layer service can translate the QoS to a User Priority (UP) value and set it in the User Priority field of the Add Traffic Stream (ADDTS) request message. The user priority can then be mapped to one or more access categories of MPDU for channel access and scheduling a transmission. In this way, a high priority application can be mapped to a QoS packet in network-layer and is further mapped to an over-the-air user priority (i.e. access category) frame.

FIGS. 3A-3D illustrate example tables 300a-d depicting user priority of traffic class for high priority and low latency MSDU and mapping to access categories of MPDU.

In an embodiment as shown in FIG. 3A, a new user priority (UP 12) can be introduced for the high priority/low latency (HP/LL) service, which can allow for use of any AC which comes earliest in ML-CCA and transmit a data frame carrying the HP/LL MPDU.

In the embodiment as shown in FIG. 3B, a virtual access category (AC), i.e., AC_ANY is introduced. AC_ANY can indicate that it can map to or use any AC, i.e., either AC_BK, AC_BE, AC_VI, or AC_VO for ML channel access. Therefore, it can allow for use of the AC with the earliest back off counter reaching to "0" in ML-CCA.

In the embodiment as shown in FIG. 3C, an existing user priority UP-3 can be re-defined and mapped to a virtual access category AC_ANY, i.e., allowing for use of an AC of the earliest back off counter reaching to "0" in ML-CCA and ML channel access.

In the embodiment as shown in FIG. 3D, an existing user priority UP-3 can be re-defined and mapped to a new access category AC_HP/LL for ML channel access. Therefore, the new access category AC_HP/LL can include a new access category of MPDU with the highest priority. A ML device may use a separate queue for AC_HP/LL from other ACs. The scheduler of a ML device may schedule a channel access for the AC_HP/LL prior to other ACs.

Figure 4:
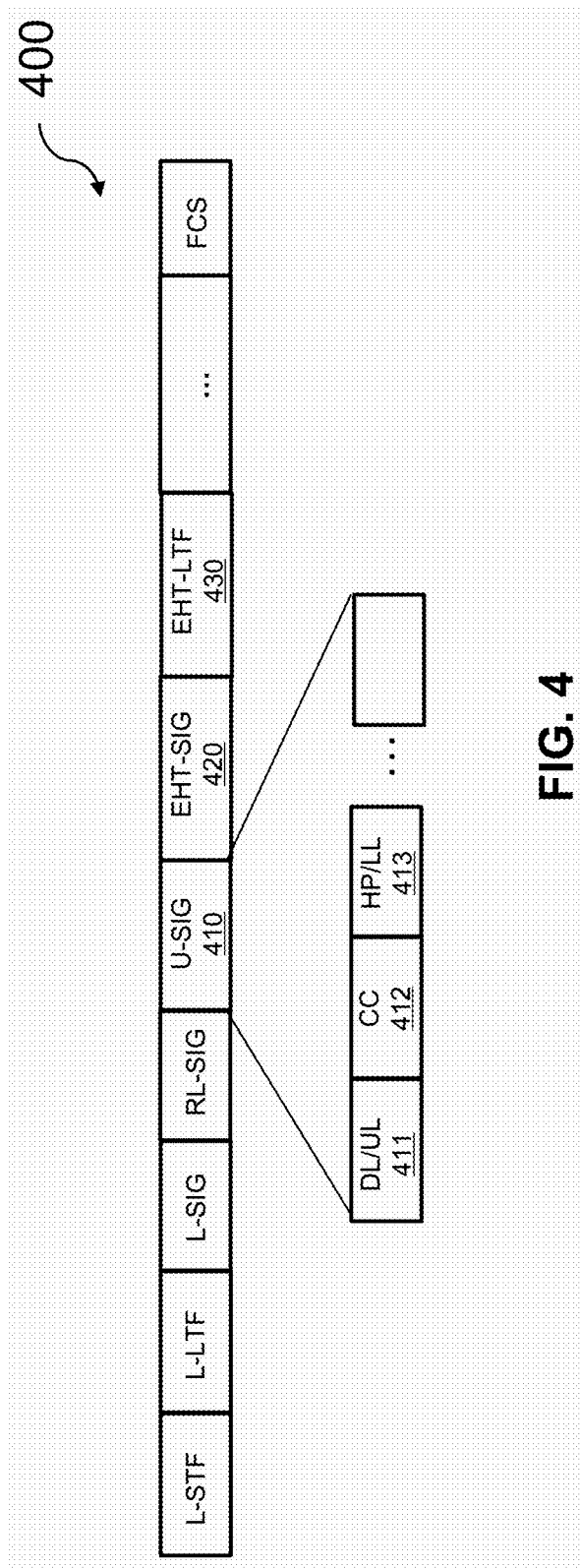
FIG. 4 illustrates an example EHT frame format with an indication of high priority/low latency of data packet being carried by this frame.

FIG. 4 illustrates an example EHT frame format 400. An EHT frame can contain a legacy preamble portion, i.e., L-STF, L-LFT, L-SIG and RL-SIG with EHT portion, i.e., Universal Signal (U-SIG) 410, EHT-SIG 420, EHT-LTF 430, MPDU, and FCS.

The legacy preamble can be used for a receiving station to detect a transmitted frame over the air interface. In order to improve the receiving signal's reliability, the repeated L-SIG (i.e., RL-SIG) can be added after L-SIG in the transmitted frame so that the receiving station may combine L-SIG with RL-SIG to improve the received signal reliability.

The U-SIG field 410 may contain a DL/UL indication field 411. This field can indicate this frame is a DL or UL transmission.

The U-SIG field 410 may contain a CC field 412. This field can include a color code of the BSS. If the frame is for DL transmission, the ML-AP can set this field of frame to its color code associated to this link. If the frame is for UL transmission, the ML-STA can set this field of frame to the color code of this link assigned by the ML-AP.

The U-SIG field 410 may contain a HP/LL field 413 This field can indicate that the frame carries a high priority/low latency MPDU. The ML transmitting device can set this field of frame to "1" if the data frame is carrying a HP/LL MPDU. Otherwise, this field can be set to "0." Other ML devices which receive this frame but not being addressed by this frame may save the HP/LL field 413 associated to the NAV and use its value to decide whether this frame is pre-emptible or not during ML CCA and ML channel access if they need to transmit a HP/LL MSPU.

A ML-CCA can include detecting any of L-STF, L-LTF, L-SIG, RL-SIG, and U-SIG.

In addition to carrying HL/LL indication in U-SIG, another way to indicate a HP/LL MPDU may be to carry this indication in an EHT-SIG or MAC header, e.g., in ETH control field, EHT variant field, etc.

A ML device may use ML virtual carrier sensing and ML physical carrier sensing mechanism to assess the channel availability.

A ML virtual carrier sensing can rely on the ML network allocation vector (NAV) to assess the channel availability. When a ML device detects a preamble and finds the transmission belongs an OBSS, it can set the ML-NAV associated to this channel to the occupancy with the period indicated by the duration field of received packet. The channel occupancy time can decrease as the time elapses. Once the ML-NAV value becomes to "0," this channel may become available for physical CCA and channel access.

When a ML device detects an OBSS transmission carrying an EHT MPDU on a channel, it can mark in its corresponding ML-NAV for a HP/LL or non HP/LL frame based on the indication in U-SIG.

When a non-STR ML device is transmitting a frame on one channel, it can mark in ML-NAVs of other channels as occupied for the period indicated by the duration field of transmitted packet.

A ML-CCA can include a set of clear channel assessments, each of which can perform a physical carrier sensing on the corresponding channel. A CCA can be used to assess the channel availability by detecting a signal transmitted over this channel. Once a CCA of ML device detects the preamble signal strength beyond the preamble detection threshold (PDT) or the received signal strength beyond OBSS_PD, it can mark in ML-NAV the channel being occupied by In-BSS or Out-BSS for the period indicated by the duration field of received packet. Otherwise, the CCA of ML device can indicate the channel is idle and trigger EDCA back off procedure.

A ML-CCA may support various back off procedures. For instance, a back off procedure can be for an independent ML-CCA. In independent ML CCA, each link can have its own CCA for channel availability assessment and its own set of back off counters. Each back off counter can correspond to an access category, such as Background (AC_BK), Best Effort (AC_BE), Video (AC_VI) or Voice (AC_VO).

As another example, a back off procedure can be for a joint ML-CCA. In the joint ML CCA, each link can have its own CCA for channel availability assessment but shares one set of back off counters. Each back off counter can correspond to an access category, such as Background (AC_BK), Best Effort (AC_BE), Video (AC_VI) or Voice (AC_VO).

Based on the back off procedure, a ML device may choose an independent ML-CCA or a joint ML-CCA for channel assessment and access.

Figure 5:
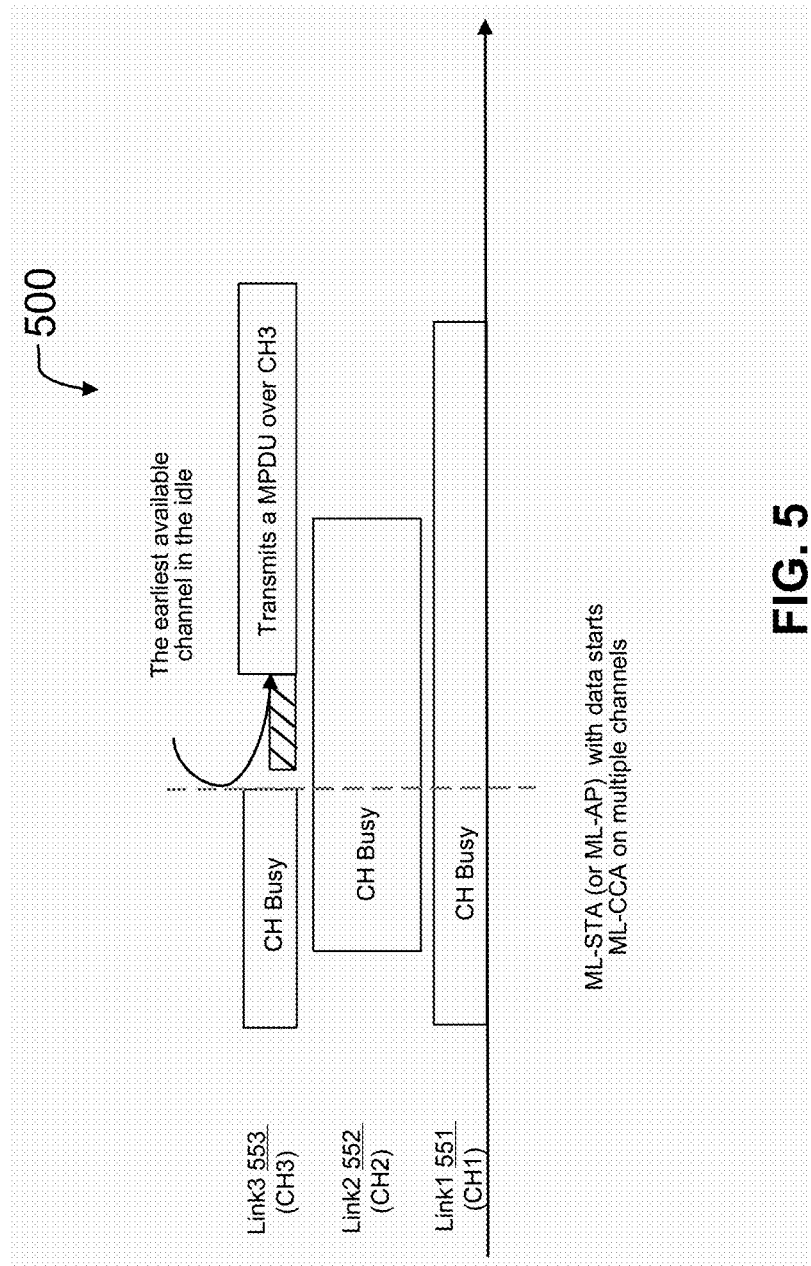
FIG. 5 illustrates an example signaling process to support low latency transmissions via utilize multi-link operation.

FIG. 5 illustrates an example signal procedure of utilizing the ML radio to support high priority/low latency transmission over the wireless interface.

In the embodiment as shown in FIG. 5, it can illustrate an example of supporting the high priority/low latency transmission via MLs. When a ML device (either ML-STA or ML-AP) is instructed by the application via setting HP/LL of UP, it can be mapped to ANY AC of traffic class for transmitting a high priority/low latency MPDU. The ML device can perform the virtual carrier sensing via checking ML-NAVs on Link1 551 (CH1), Link2 552 (CH2) and Link3 553 (CH3). If at least one of those channels is not set by ML-NAV, the ML device may simultaneously perform the physical ML-CCA sensing on those channels not being set by the ML-NAVs to find the earliest available channel(s) for the high priority/low latency transmission. In this example, the ML device may find the CH3 is the earliest available channel among the MLs if its ML back off counter corresponding to an access category reaches to 0 first and the ML-CCA can still detect the CH3 in idle. The ML device can then transmit a MPDU with HP/LL UP over the CH3.

Figure 6A:
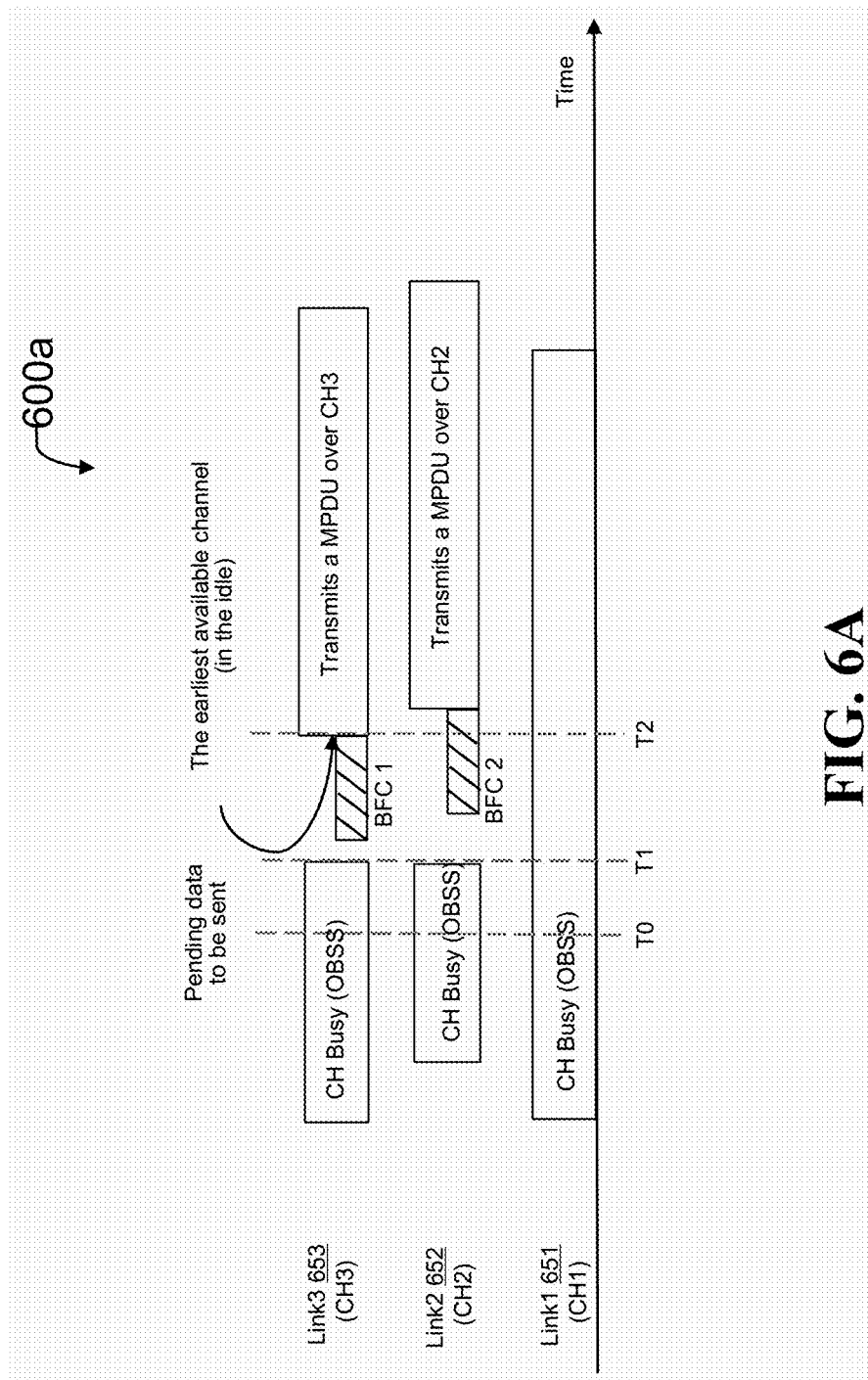
FIG. 6A illustrates an example signaling process of multi-link clear channel assessment and multi-link channel access using an independent and a joint multi-link channel assessment for simultaneous transmission and reception multi-link device, according to a first embodiment.
Figure 6B:
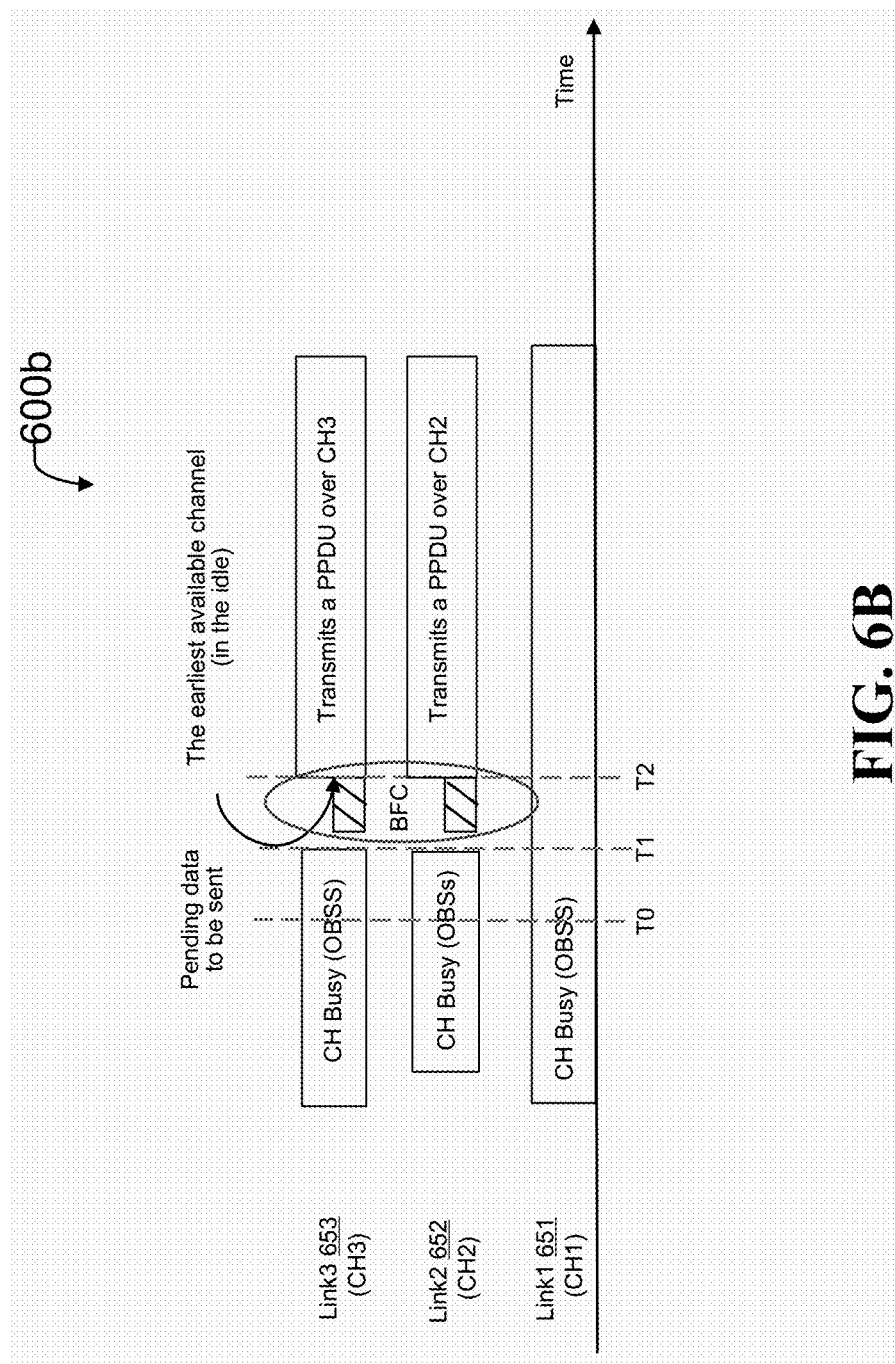
FIG. 6B illustrates an example signaling process of multi-link clear channel assessment and multi-link channel access using an independent and a joint multi-link channel assessment for simultaneous transmission and reception multi-link device, according to a second embodiment.
Figure 6C:
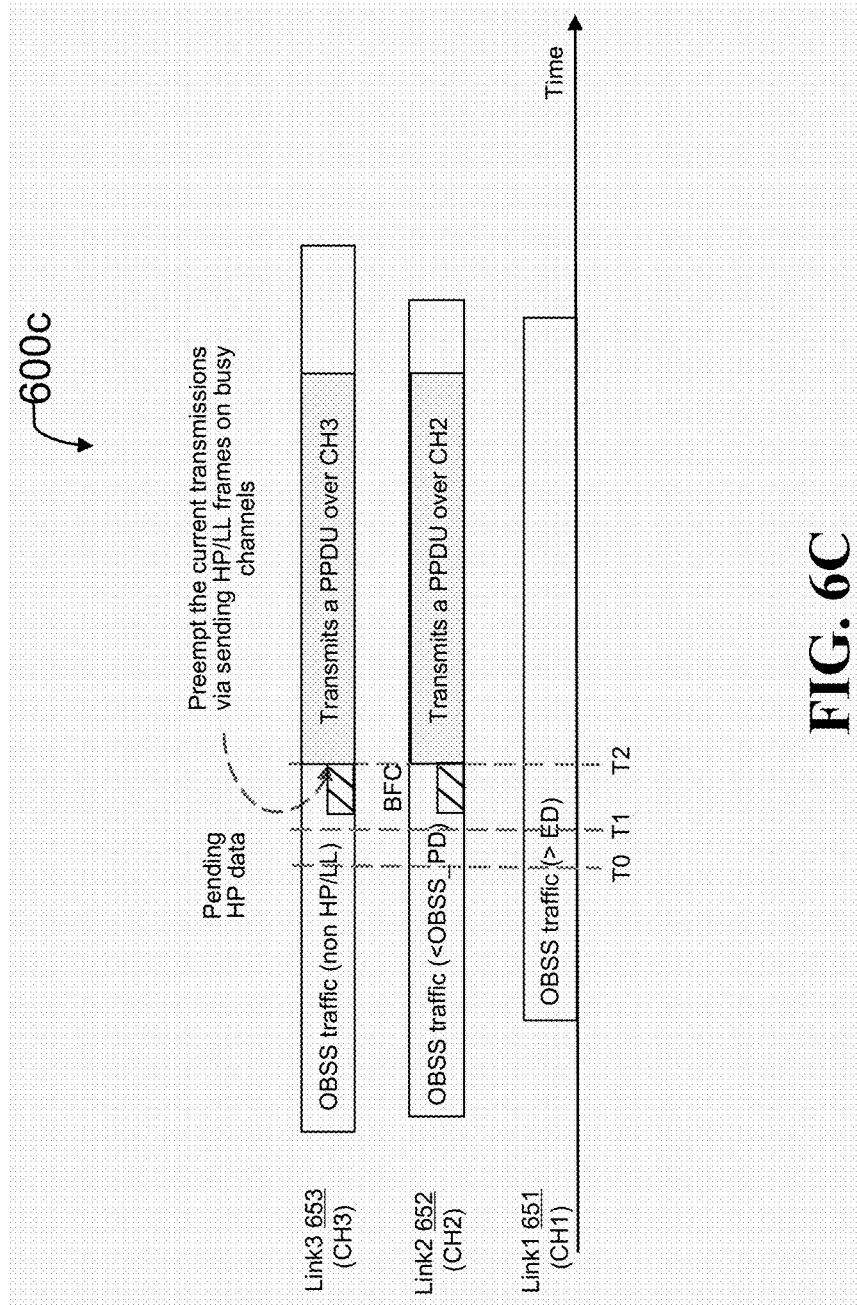
FIG. 6C illustrates an example signaling process of multi-link clear channel assessment and multi-link channel access using an independent and a joint multi-link channel assessment for simultaneous transmission and reception multi-link device, according to a third embodiment.

FIGS. 6A-6C illustrate example procedures of STR capable ML device using an independent ML-CCA on each link and a joint ML-CCA for support of high priority and low latency transmissions. In embodiments of FIG. 6A-6C, a STR capable ML device (either non-AP MLD or AP MLD) can include three radios which operate on a radio channel 1 (CH1), a radio channel 2 (CH2) and a radio channel 3 (CH3) respectively to establish corresponding communication link 1 651, link 2 652 and link 3 653.

In the first embodiment as shown in FIG. 6A, a STR capable ML device can have multiple independent CCA, each of which is associated to a link and has its own set of CCA back off counters to corresponding ACs. All sets of CCA back off counters of all links can use the same set of EDCA parameters, like CW, CWmin, CWmax, etc. of ML device. However, each radio of ML device can use its own set of CCA back off counters, each of which is corresponding to an AC to count idle slots independently on its link. This can allow for each radio of ML device to sense its operating channel and perform channel access independently.

In this example, a STR capable ML device can receive a pending HP/LL MPDU in its queue(s) at the time of T0. As all channels, i.e., CH1, CH2 and CH3, are busy at T0 according to their ML-NAV values, the ML device can defer its physical CCA until at least one of ML-NAVs becomes "0" at T1. If a radio of ML device performing CCA detects the channel in idle (e.g., CH2 or CH3), the CCA back off counters corresponding to ACs as shown in FIG. 3B for that link are reduced by "1." If none of back off counter reaches to "0", the radio of ML device can continue a CCA process on its link (e.g. CH2 or CH3) until at least one of CCA back off counters reaches to "0" or this link becomes busy. If one CCA back off counter reaches to "0" and this link is still sensed as idle (e.g., CH2 or CH3), the ML device can begin to acquire a TXOP on this link (e.g., CH2 or CH3) via transmitting a control frame (e.g., ML-RTS, Trigger frame, etc.) or a data frame carrying the HP/LL MPDU. The ML device may transmit a same MPDU or different MPDU over CH2 and CH3 depending on the transmission requirement such as reliability or throughput.

In the second embodiment as shown in FIG. 6B, a STR capable ML device can include multiple independent CCA sensors, each of which can be associated to a link. However, the CCA sensors can share a set of joint ML CCA back off counters, each of which corresponds to an AC, such as described with respect to FIG. 3B. If any radio of the ML device performing CCA detects its channel idle, the joint ML-CCA back off counters corresponding to ACs can be reduced by "1." If multiple channels (e.g., "N" channels) are sensed idle, the joint ML-CCA back off counters corresponding to ACs can be reduced by "N." Accordingly, the joint ML-CCA can significantly reduce the waiting time on the idle channels and expedite the ML device to access to the earliest available channel to meet the high priority/low latency requirement.

In this example, a STR capable ML device may obtain a pending HP/LL MPDU in its queue(s) at T0. As all channels, i.e., CH1, CH2, and CH3 are busy at T0 according to their ML-NAV values, the ML device can defer its physical CCA until at least one of ML-NAVs of corresponding links becomes "0" at T1. If any applicable radio of ML device performing CCA detects the channel in idle (e.g., CH2 and CH3), the joint ML-CCA back off counters corresponding to ACs can be reduced by "1."

In this example, the joint ML-CCA back off counter of each AC can be reduced by "2," as both CH2 and CH3 are sensed as idle. Accordingly, as more channels are sensed as idle at same time, there can be more reduction on the joint ML-CCA back off counter of each AC. If none of the joint ML-CCA back off counters reaches to "0," any radio with ML-NAV=0 of the ML device can continue CCA on its link (e.g. CH2 and CH3) until at least one of joint ML-CCA back off counters reaches to "0" or all links become busy. If at least one of the joint ML-CCA back off counter reaches to "0" and at least one of links is still sensed as idle (e.g. CH2 and CH3), the ML device can start to acquire the TXOP on the idle link(s) (e.g. CH2 and CH3) via transmitting a control frame (such as ML-RTS) or a data frame carrying the HP/LL MPDU directly.

The ML device may transmit a same MPDU or different MPDU over CH2 and CH3 depending on a transmission requirement, such as reliability or throughput.

In the third embodiment as shown in FIG. 6C, it can illustrate the procedure of a joint ML-CCA and a channel access with preemption of a current OBSS transmission.

A STR capable ML device can use a joint ML-CCA, which has multiple independent CCA sensors. Each CCA in the joint ML-CCA can be associated to links but share one set of back off counters for ACs.

As illustrated in FIG. 6C, a STR capable ML device may obtain a pending HP/LL MPDU in its AC queue(s) at T0. At that time, all channels, i.e., CH1, CH2, and CH3 may be busy according to their ML-NAV values. The CH1 may be occupied by OBSS traffic and the signal strength measurement may be over an Energy Detection (ED) threshold. The CH2 may be occupied by other OBSS traffic, but a signal strength measurement can be less than the OBSS Preamble Detection (OBSS_PD) threshold. The CH3 may be occupied by a different OBSS traffic with indication of HP/LL="1" in the frame header.

If OBSS traffic is detected as non HP/LL traffic, the ML device can mark Pre-emptible Indication (PRE_IND="1") in the ML-NAV of this channel. If the signal strength measurement of OBSS traffic is less than OBSS_PD threshold, the ML device can mark the PRE_IND="1" in the ML-NAV of this channel as well.

A ML device may perform ML-CCA on a link marked PRE_IND="1" in ML-NAV. When the ML device detects PRE_IND during ML-NAV checking, it can ignore the ML-NAV setting on those channels and then can perform ML-CCA immediately at T1 with a higher ML-CCA detection threshold, e.g., the detection threshold for HP/LL transmission. If any applicable radio of ML device performing ML-CCA detects the channel in idle (e.g. CH2 and CH3), the joint ML-CCA back off counters corresponding to ACs can be reduced by "1." In this example, the joint ML-CCA back off counter of each AC can be reduced by "2," as both CH2 and CH3 are sensed as idle. If none of the joint ML-CCA back off counters reaches to "0," any radio on channel with PRE_IND="0" in ML-NAV can continue the CCA procedure on its link (e.g., CH2 and CH3) until at least one of joint ML-CCA back off counters reaches to "0" or all links become busy. If at least one of the joint ML-CCA back off counter reaches to "0" and at least one of links is still sensed as idle (e.g., CH2 and CH3), the ML device can start to acquire the TXOP on the idle channel(s) (e.g., CH2 and CH3) via transmitting a control frame (such as ML-RTS, Trigger frame, etc.) or a data frame carrying the HP/LL MPDU.

The ML device may transmit a same MPDU or different MPDU over CH2 and CH3 depending on the transmission requirement such as reliability or throughput.

FIGS. 7A-7D illustrate example procedures of non-STR capable ML device using an independent ML-CCA on each link and a joint ML-CCA for support of high priority/low latency transmission. In embodiments of FIGS. 7A-7C, a STR capable ML device can include three radios which operate on a radio channel 1 (CH1), a radio channel 2 (CH2) and a radio channel 3 (CH3) respectively to establish corresponding communication link1 751, link2 752, and link3 753.

Figure 7A:
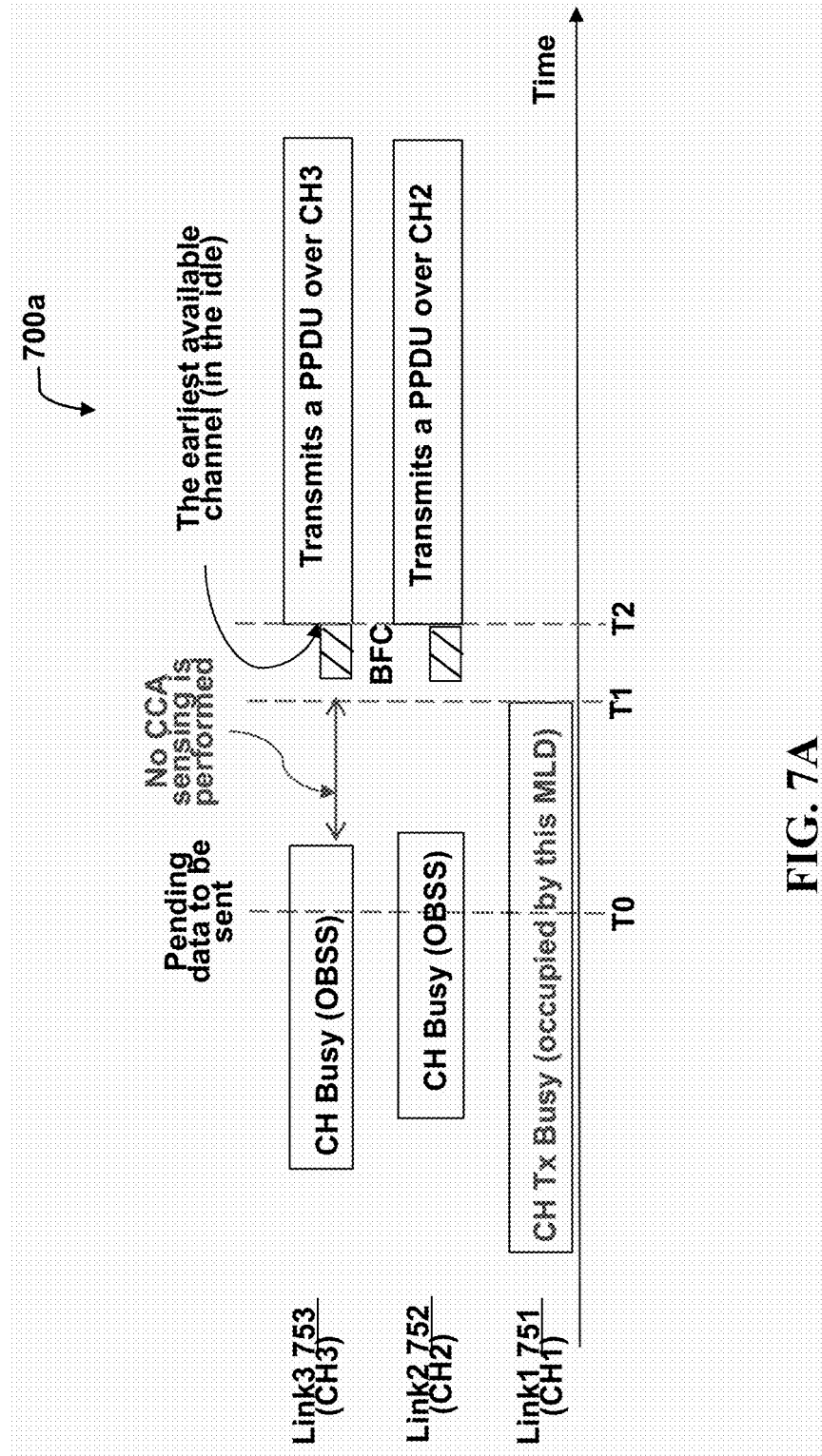
FIG. 7A illustrates an example signaling process of multi-link clear channel assessment and multi-link channel access using an independent and a joint multi-link channel assessment for non-simultaneous transmission and reception multi-link device, according to a first embodiment.

In the first embodiment, as shown in FIG. 7A, it can illustrate the ML-CCA and channel access procedure without interference to the current communication when the non-STR capable ML device is transmitting a frame. A non-STR capable ML device (either ML-STA or ML-AP) can include multiple independent ML-CCA sensors, each of which can be associated to a link and has its own set of back off counters for ACs, but all ML CCAs can use the same set of EDCA parameters (like CW, CWmin, CWmax, etc.) corresponding to the ACs.

A non-STR capable ML device may use a joint ML-CCA mechanism which contains multiple independent CCA, each of which can be associated to a link but shares one set of back off counters for the ACs of the ML device.

As shown in the example, a non-STR ML device can receive from an application a HP/LL MSDU pending in a queue at the time T0. As all channels, i.e., CH1, CH2 and CH3, are busy at the time T0 according to their ML-NAV values, the ML device can defer its physical CCA until at least one of ML-NAVs is equal to "0" (e.g., link3 753). However, the non-STR capable ML device still may be unable to perform ML-CCA sensing on idle links (e.g., link3 753) due to the self-interference from the transmission over the link1 751. Therefore, ML-CCA can stop on any link and the back off counting, even if the link2 752 or link3 753 are idle after T0. When the non-STR ML device completes its transmission on the link1 751 at the time T1, it may resume ML-CCA and back off counting on other links (e.g., link2 752 and link3 753).

If a radio of the ML device performing ML-CCA detects its channel in idle (e.g. CH2 or CH3), the CCA back off counters corresponding to ACs can be reduced by "1" for the independent ML-CCA mechanism or by "2" for the joint ML-CCA mechanism if both CH2 and CH3 are detected idle, for example. If none of back off counter reaches to "0" after ML-CCA, the ML device can continue the ML-CCA process on the corresponding links (e.g., CH2 and/or CH3) until at least one of ML-CCA back off counters reaches to "0" or all links become busy. If one ML-CCA back off counter reaches to "0" and the link is still sensed as idle (e.g., CH2 and CH3), the ML device can start to acquire the TXOP on those links (e.g., CH2 and CH3) via transmitting a control frame (such as ML-RTS, Trigger frame, etc.) or a data frame carrying the HP/LL MPDU.

The ML device may transmit a same MPDU or different MPDU over CH2 and CH3 depending on the transmission requirement such as reliability or throughput.

Figure 7B:
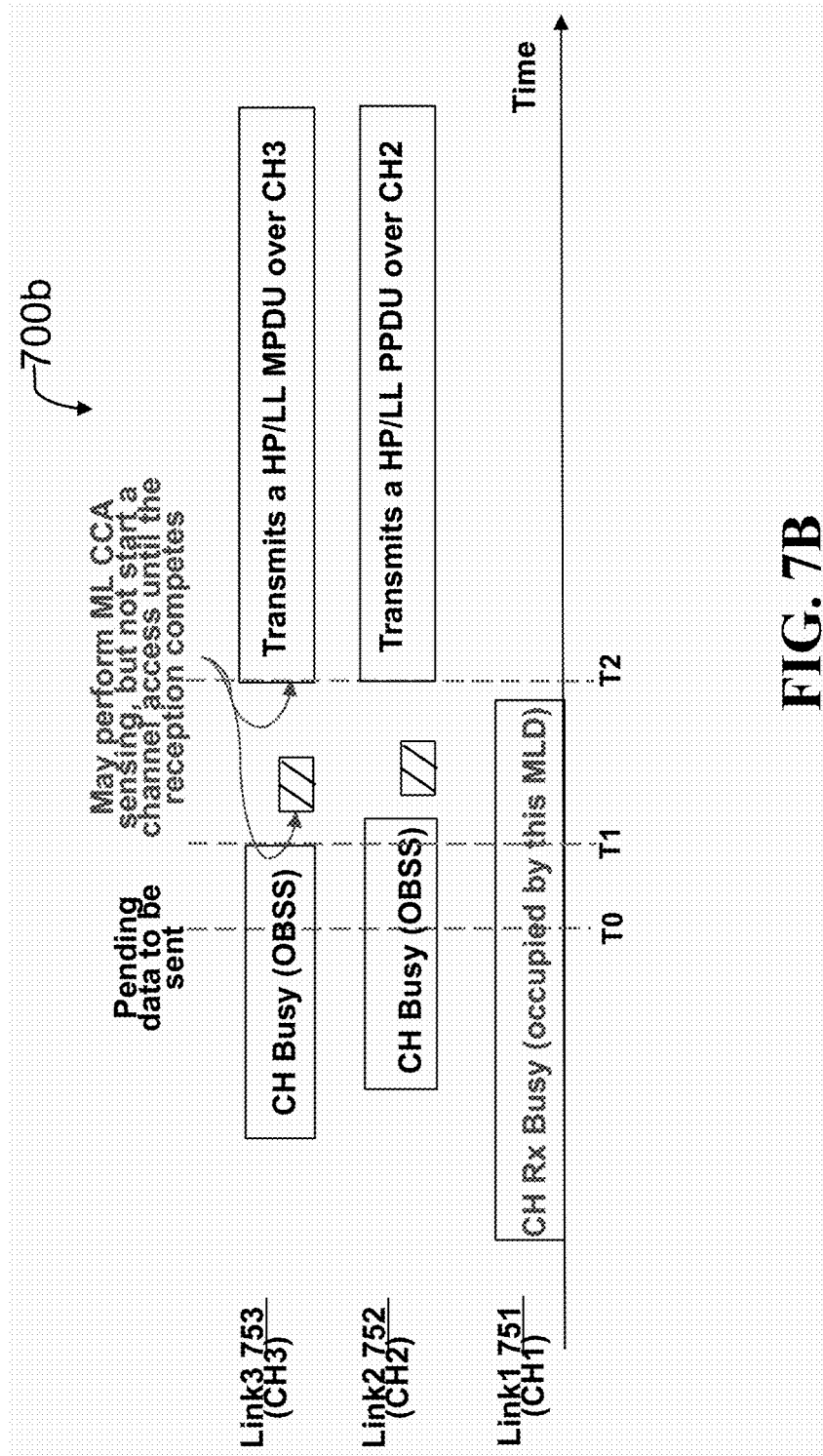
FIG. 7B illustrates an example signaling process of multi-link clear channel assessment and multi-link channel access using an independent and a joint multi-link channel assessment for non-simultaneous transmission and reception multi-link device, according to a second embodiment.

In the second embodiment, as shown in FIG. 7B, it can illustrate the ML CCA and channel access procedure without interference to the current communication when the non-STR capable ML device is receiving a frame.

A non-STR capable ML device can include multiple independent CCA sensors, each of which can be associated to a link and has its own set of back off counters for ACs, but all CCAs can use the same set of EDCA parameters (CW, CWmin, CWmax, etc.) corresponding to the ACs.

A non-STR capable ML device may use a joint ML-CCA mechanism which contains multiple independent CCA, each of which can associated to a link. In the joint ML-CCA mechanism, all CCAs share one set of back off counters for the ACs.

As shown in the example, a non-STR ML device can receive from an application a HP/LL MSDU pending in its queue at the time T0. As all channels, i.e., CH1, CH2, and CH3 are busy at the time T0 according to their ML-NAV values, the ML device may defer its physical CCA until at least one of ML-NAVs is equal to "0" (e.g., link3 753) at the time T1.

When one of ML-NAV values becomes "0," the non-STR capable ML device may perform ML-CCA (either the independent ML-CCA or the joint ML-CCA mechanism) on this un-occupied link (e.g., link2 752 or link3 753) during receiving a frame on other link(s) (e.g., link1 651). After a back off counter of either the independent ML-CCA or the joint ML-CCA reaches to "0," however, the non-STR ML device may be unable to perform channel access on the un-occupied link(s) as the transmitting signal of channel access will interfere to the ongoing communication on other link(s) (e.g., link1 751). Instead, the non-STR ML device may hold the channel access until the reception (e.g., on link1 751) completes. Once the reception on the link1 751 completes, the non-STR ML device may access to the media immediately after a SIFS at T2. This may reduce the channel access delay comparing to the ML CCA and channel access mechanism in FIG. 7A.

The ML device may transmit a same MPDU or different MPDU over CH2 and CH3 depending on the transmission requirement such as reliability or throughput.

Figure 7C:
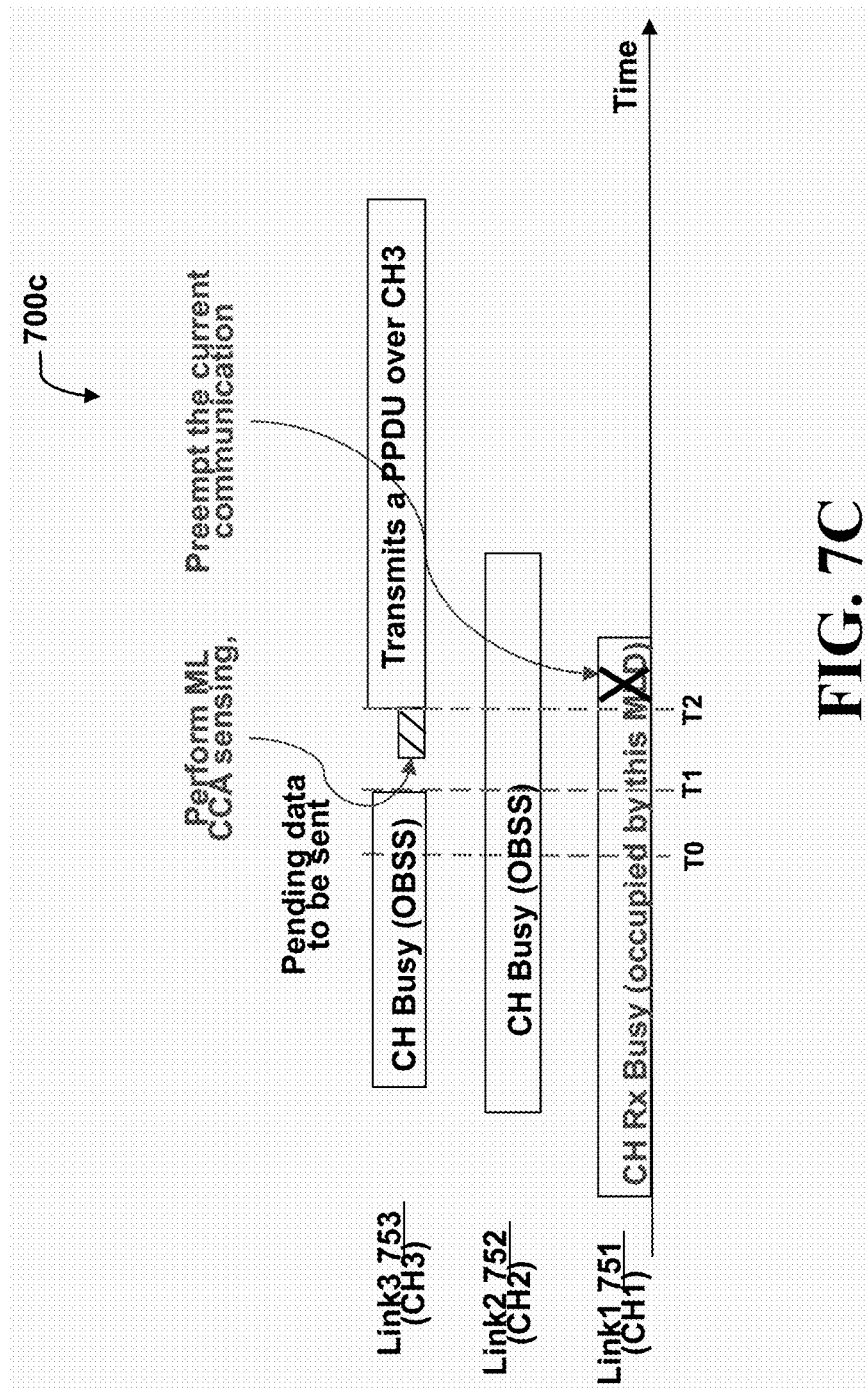
FIG. 7C illustrates an example signaling process of multi-link clear channel assessment and multi-link channel access using an independent and a joint multi-link channel assessment for non-simultaneous transmission and reception multi-link device, according to a third embodiment.

In the third embodiment as shown in FIG. 7C, it can illustrate the ML-CCA and channel access procedure with preemption of the current non HP/LL communication to the non-STR capable ML device.

A non-STR capable ML device may use an independent ML-CCA mechanism which has multiple independent CCA, each of which can be associated to a link and has its own individual set of back off counters for ACs, but all CCAs can use the same set of EDCA parameters (CW, CWmin, CWmax, etc.) corresponding to the ACs.

A non-STR capable ML device may use a joint ML-CCA mechanism which contains multiple independent CCA, each of which can be associated to a link but share one set of back off counters for the ACs.

As shown in the example, a non-STR ML device can receive from an application a HP/LL MSDU pending in its queue at the time T0. As all channels, i.e., CH1, CH2, and CH3 are busy at the time T0 according to their NAV values (>0), the ML device can defer its physical CCA until at least one of ML-NAVs is equal to "0" (e.g., link3 653) at the time T1.

After one of ML-NAV values becomes "0," the non-STR capable ML device can start ML-CCA (either the independent ML-CCA or the joint ML-CCA mechanism) on this un-occupied link (e.g., link3 753) at T1 during receiving a non HP/LL MPDU on another link (e.g., link1 751). After a back off counter of either the independent ML-CCA or the joint ML-CCA reaches to "0," the non-STR ML device can perform the channel access on the un-occupied channel (e.g., CH3) at T2 and preempts its current non HP/LL communication on another link (e.g., link1 751 on CH1).

Figure 7D:
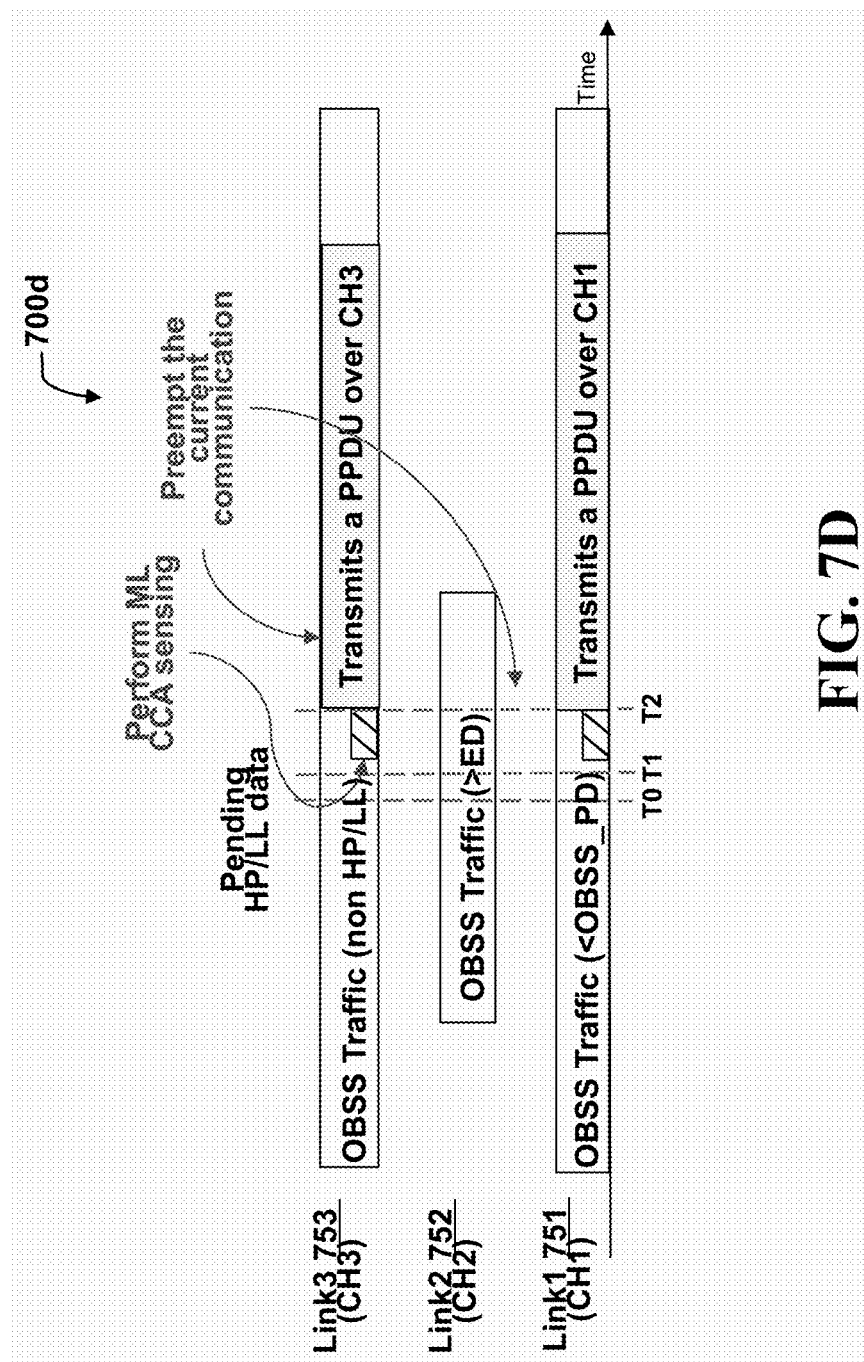
FIG. 7D illustrates an example signaling process of multi-link clear channel assessment and multi-link channel access using an independent and a joint multi-link channel assessment for non-simultaneous transmission and reception multi-link device, according to a fourth embodiment.

In the fourth embodiment as shown in FIG. 7D, it can illustrate the ML-CCA and channel access procedure with preemption of a current non HP/LL OBSS communication for the HP/LL transmission.

A non-STR capable ML device may use an independent ML-CCA mechanism which has multiple independent CCA, each of which can be associated to a link and has its own individual set of back off counters for ACs, but all CCAs can use the same set of EDCA parameters (CW, CWmin, CWmax, etc.) corresponding to the ACs.

A non-STR capable ML device may use a joint ML-CCA mechanism that contains multiple independent CCA, each of which can be associated to a link but share one set of back off counters for the ACs.

As shown in the example, a non-STR ML device can receive from an application a HP/LL MSDU pending in its queue at the time T0. All channels, i.e., CH1, CH2, and CH3 are busy at the time T0 according to their ML-NAV values (>0), but some channels can carry non HP/LL OBSS traffic (e.g., link3 753) or carrying an OBSS frame with signal strength measurement less that OBSS_PD (e.g., link1 751). The ML device can perform ML CCA with the detection threshold for HP/LL transmission on the channels carrying non HL-LL OBSS MPDU (e.g., CH3) or an OBSS frame with the signal strength measurement less than OBSS_PD (e.g., link1 751) at the time T1. After a back off counter of either the independent ML-CCA or the joint ML-CCA reaches to "0," the non-STR ML device can perform the channel access on the link (e.g., link1 751 and/or link3 753) at the time T2 which may preempt the current OBSS communication on those links. The non-STR ML device may transmit a same MPDU or different MPDU over CH1 and CH3 depending on the transmission requirement such as reliability or throughput.

If the ML transmission succeeds, the ML device may reduce the CW size and reset the back off counter to the CW. If the ML transmission fails, the ML device may double the CW size, reset the back off counter to the CW, and then perform the same ML-CCA for channel access to re-transmit the failed MPDU with the same sequence number.

In some embodiments, the present embodiments can relate to identifying a high priority/low latency data packet so that a multi-link device may schedule its transmission in a priority manner.

In some embodiments, the present embodiments can relate to identifying a high priority/low latency data packet includes a mapping it to any access category of traffic class so that the high priority/low latency data packet can be scheduled for transmission prior to other access category traffics.

In some embodiments, the present embodiments can relate to performing multi-link clear channel assessment to detect the earliest available channel(s) for transmission of high priority/low latency packet.

In some embodiments, the present embodiments can relate to performing a multi-link assessment includes utilizing a joint multi-link clear channel assessment mechanism to speed up the assessment procedure over multi-link significantly comparing to the existing clear channel assessment over one link.

In some embodiments, the present embodiments can relate to performing multi-link clear channel assessment over a channel carrying a pre-emptible communication and transmitting a high priority/low latency packet on this channel.

Figure 8:
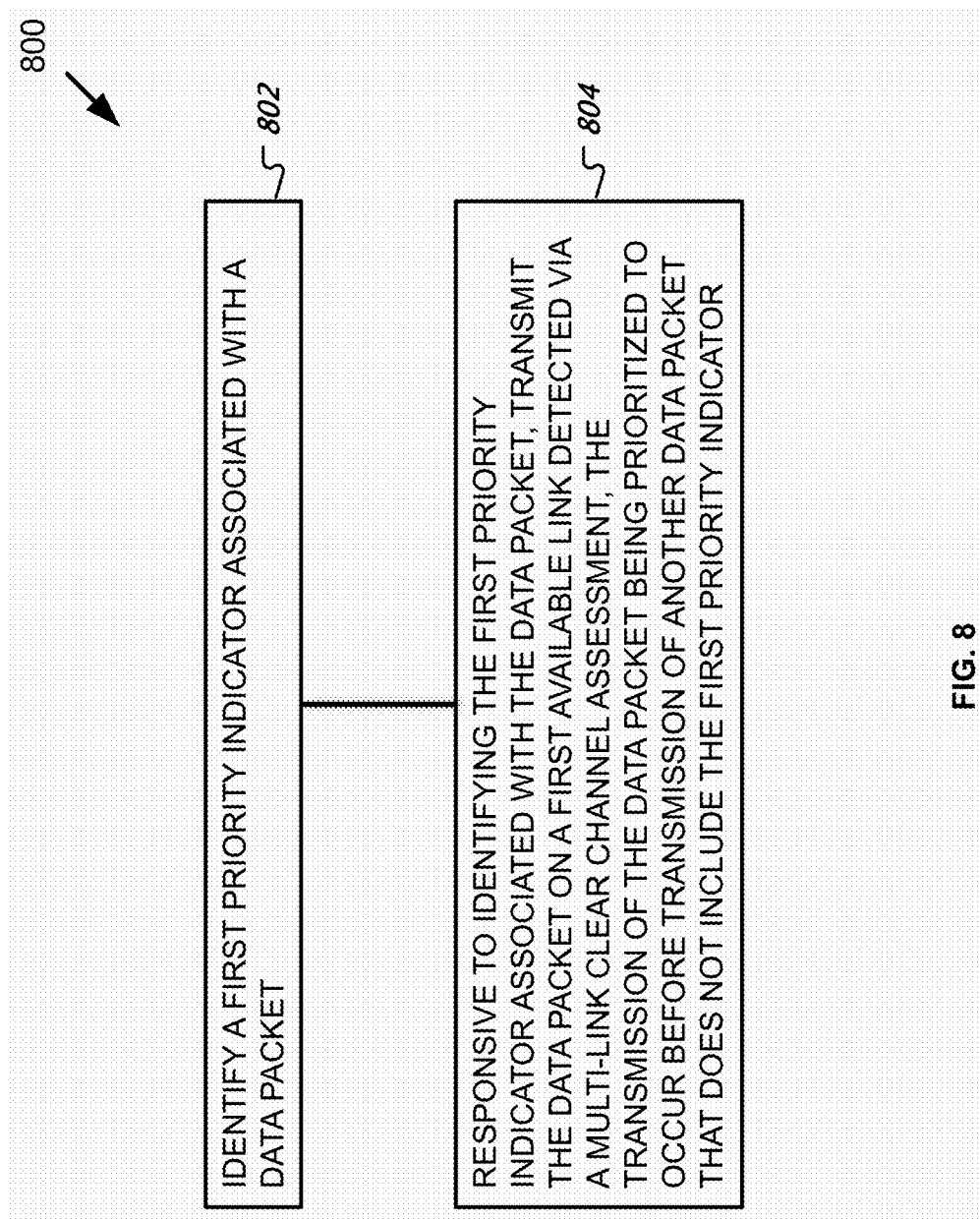
FIG. 8 illustrates an example method for utilizing the multi-link channel assessment mechanism and multi-link channel access to reduce the access delay, improve transmission reliability, and increase transmission throughput.

FIG. 8 illustrates an example method 800 for utilizing the multi-link channel assessment mechanism and multi-link channel access to reduce the access delay, improve transmission reliability, and increase transmission throughput.

In an exemplary embodiment, a method for wireless communication can include identifying, by a radio node, a first priority indicator associated with a data packet (block 802). The radio node can include a multi-link station (e.g., ML-STA 1 110) as described herein. The first priority indicator can include an indicator indicative of a high priority and low latency service as described herein.

The method can also include, responsive to identifying the first priority indicator associated with the data packet, transmitting, by the radio node, the data packet on a first available link detected via a multi-link clear channel assessment, the transmission of the data packet being prioritized to occur before transmission of another data packet that does not include the first priority indicator (block 804).

In some embodiments, the multi-link clear channel assessment includes inspecting, by the radio node, a multi-link network allocation vector (ML-NAV) value for each link of the multiple links to determine whether the first available link is available for transmission of the data packet, and responsive to determining that the first available link is available for transmission of the data packet, initiating, by the radio node, a back off counter for the first available link, wherein the data packet is transmitted responsive to determining that the back off counter has expired.

In some embodiments, the first priority indicator is associated with a user priority associated with a first priority service. The first priority service can include the high priority and low latency service as described herein.

In some embodiments, the first priority service allows the radio node to utilize any access category virtually with an earliest availability via a multi-link assessment, wherein the data packet includes a data frame including a high priority and low latency media access control (MAC) protocol data unit (MPDU).

In some embodiments, the user priority associated with the first priority service includes a user priority value of 12.

In some embodiments, the user priority associated with the first priority service includes a user priority value of 3 that corresponds to a virtual access category relating to any channel access or a high priority channel access.

In some embodiments, the method includes mapping, by the radio node, the user priority associated with the first priority service to a corresponding first access category for multi-link channel access.

In some embodiments, the method includes obtaining, by the radio node, an extremely high throughput (EHT) message that includes the first priority indicator, wherein the first priority indicator is included within a universal signal portion of the EHT message.

In some embodiments, the method includes, for each link of the multiple links of the radio node, determining, by the radio node, that a first link is in an idle state, responsive to determining that the first link is in to the idle state, starting, by the radio node, a back off counter associated with an access category relating to the first priority indicator, and responsive to determining that the back off counter has expired, transmitting, by the radio node, the data packet over the first link, the data packet including a MAC protocol data unit (MPDU) with the user priority associated with the first priority service.

In some embodiments, determining that the first link is in the idle state includes performing a clear channel assessment of the multiple links of the radio node.

In some embodiments, the method includes receiving, by the radio node, a first message that includes the first priority indicator at a first time, determining, by the radio node, that a first link and a second link is in an idle state at a second time, starting, by the radio node, an independent back off counter for each of the first link and second link responsive to determining that each of the first link and the second link is in the idle state, and responsive to each independent back off counter expiring, transmitting, by the radio node, at least a portion of the data packet over each of the first link and second link. Starting the independent back off counter for each of the first link and second link can include any of initializing the back off counter or resuming an existing back off counter.

In some embodiments, the method includes receiving, by the radio node, a first message that includes the first priority indicator at a first time, determining, by the radio node, that a first link and a second link is in an idle state at a second time, starting, by the radio node, a back off counter common to each of the first link and second link responsive to determining that each of the first link and the second link is in the idle state, and responsive to determining that the back off counter has expired, transmitting, by the radio node, at least a portion of the data packet over each of the first link and second link.

In some embodiments, the method includes receiving, by the radio node, a first message that includes the first priority indicator at a first time, determining, by the radio node, whether each link of the multiple links includes a signal strength measurement that is less than an overlapping basis service set preamble detection threshold, responsive to determining that each of a first link and a second link of the multiple links includes signal strength measurements that are less than the overlapping basis service set preamble detection threshold, starting, by the radio node, a back off counter common to each of the first link and second link, and responsive to determining that the back off counter has expired, transmitting, by the radio node, at least a portion of the data packet over each of the first link and second link, wherein any other communication over the first link and second link are preempted by the data packet.

In some embodiments, said transmitting at least the portion of the data packet over each of the first link and second link includes transmitting the data packet with a signal strength that is greater than a signal strength of overlapping basic service set (OBSS) data transmitted over the first link and second link.

In some embodiments, the method includes receiving, by the radio node, a first message that includes the first priority indicator at a first time, determining, by the radio node, that all links of the multiple links are in an idle state at a second time, wherein a clear channel assessment of the multiple links is not performed until determining that all links of the multiple links are in the idle state at the second time, starting, by the radio node, an individual back off counter for each of the first link and second link, and responsive to determining that the individual back off counters have expired at a third time, transmitting, by the radio node, at least a portion of the data packet over each of the first link and second link.

In some embodiments, the method includes receiving, by the radio node, a first message that includes the first priority indicator at a first time, determining, by the radio node, that a first link is in an idle state at a second time, starting, by the radio node, a first back off counter for the first link, determining, by the radio node, that a first link is still in the idle state at third time, starting, by the radio node, a second back off counter for the second link, and responsive to expiry of the first back off counter and the second back off counter and determining that all links are in the idle state at a fourth time, transmitting, by the radio node, at least a portion of the data packet over each of the first link and second link.

In some embodiments, the method includes receiving, by the radio node, a first message that includes the first priority indicator at a first time, determining, by the radio node, that a first link is in an idle state at a second time, starting, by the radio node, a first back off counter for the first link, transmitting, by the radio node, the data packet over the first link, wherein the transmission of the data packet over the first link preempts a transmission over a second link.

In some embodiments, the method includes receiving, by the radio node, a first message that includes the first priority indicator at a first time, determining, by the radio node, that a first link of the multiple links includes a signal strength measurement that is less than an overlapping basis service set preamble detection threshold and that a third link is greater than the overlapping basis service set preamble detection threshold, determining, by the radio node, that a second link includes data traffic that does not include any high priority low latency indicators, starting, by the radio node, a first back off counter for the first link and a second back off counter for the second link, and responsive to determining that the first and second back off counters have expired, transmitting, by the radio node, at least a portion of the data packet over each of the first link and second link.

In some embodiments, said transmitting at least the portion of the data packet over each of the first link and second link includes transmitting the data packet with a signal strength that is greater than a signal strength of OBSS data transmitted over the first link and second link.

Example Wireless System

Figure 9:
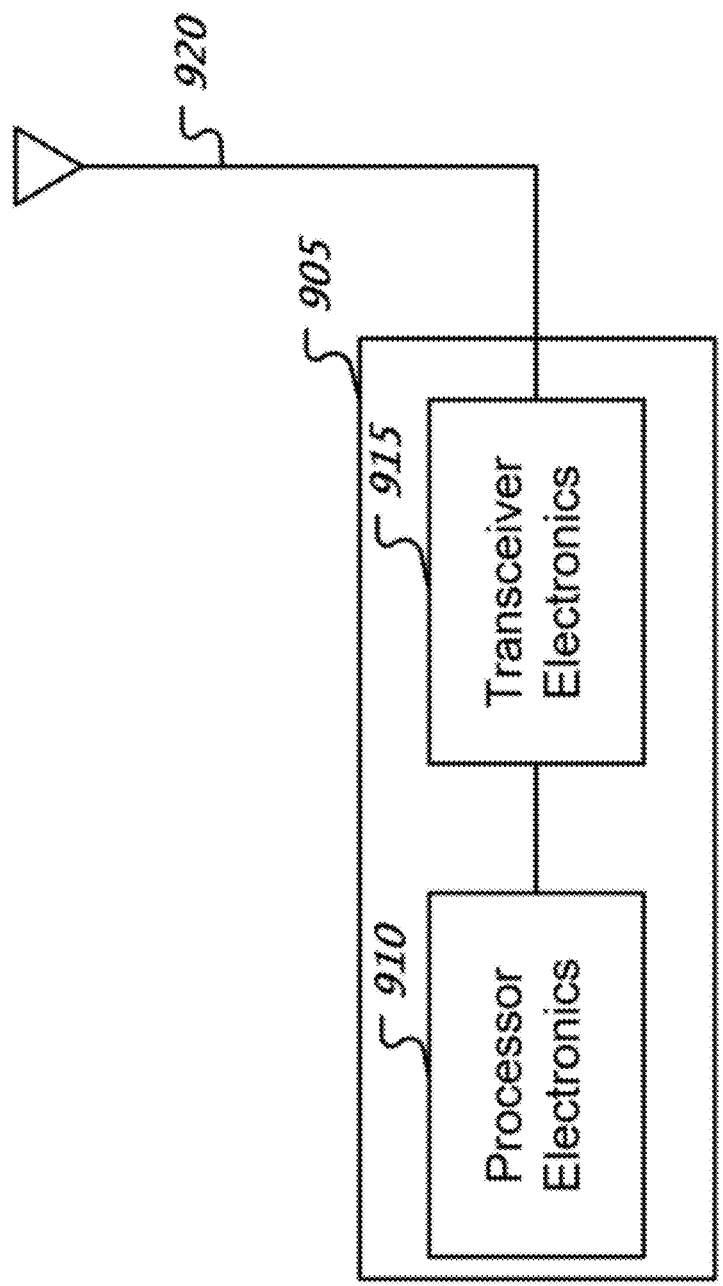
FIG. 9 is a block diagram representation of a portion of a hardware platform.

FIG. 9 is a block diagram representation of a portion of a hardware platform. A hardware platform 905 such as a network device or a base station or a wireless device (or UE) can include processor electronics 910 such as a microprocessor that implements one or more of the techniques presented in this document. The hardware platform 905 can include transceiver electronics 915 to send and/or receive wired or wireless signals over one or more communication interfaces such as antenna 920 or a wireline interface. The hardware platform 905 can implement other communication interfaces with defined protocols for transmitting and receiving data. The hardware platform 905 can include one or more memories (not explicitly shown) configured to store information such as data and/or instructions. In some implementations, the processor electronics 910 can include at least a portion of the transceiver electronics 915. In some embodiments, at least some of the disclosed techniques, modules or functions are implemented using the hardware platform 905.

CONCLUSION

From the foregoing, it will be appreciated that specific embodiments of the presently disclosed technology have been described herein for purposes of illustration, but that various modifications may be made without deviating from the scope of the invention. Accordingly, the presently disclosed technology is not limited except as by the appended claims.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described, and other implementations, enhancements and variations can be made based on what is described and illustrated in this patent document.

What is claimed is:

1. A method for wireless communication, comprising:
   identifying, by a radio node, a first priority indicator associated with a data packet;
   responsive to the identifying the first priority indicator associated with the data packet, transmitting, by the radio node, the data packet on a first available link detected via a multi-link clear channel assessment, wherein transmission of the data packet is prioritized to occur before transmission of another data packet that does not include the first priority indicator;
   receiving, by the radio node, a first message that includes the first priority indicator at a first time;
   determining, by the radio node, whether each link of multiple links includes a signal strength measurement that is less than an overlapping basis service set preamble detection threshold;
   responsive to the determining that each of a first link and a second link of the multiple links includes signal strength measurements that are less than the overlapping basis service set preamble detection threshold, starting, by the radio node, a back off counter common to each of the first link and the second link; and responsive to determining that the back off counter has expired, transmitting, by the radio node, at least a portion of the data packet over each of the first link and the second link, wherein any other communication over the first link and the second link are preempted by the data packet.

2. The method of claim 1,
wherein the first priority indicator is associated with a user priority associated with a first priority service, and
wherein the first priority service allows the radio node to utilize any access category virtually with an earliest availability via a multi-link assessment, wherein the data packet includes a data frame including a high priority and low latency media access control (MAC) protocol data unit (MPDU).

3. The method of claim 1, further comprising:
obtaining, by the radio node, an extremely high throughput (EHT) message that includes the first priority indicator, wherein the first priority indicator is included within a universal signal portion of the EHT message.

4. The method of claim 3, further comprising:
determining, by the radio node, that a link from the multiple links of the radio node is in an idle state;
responsive to the determining that the link is in the idle state, starting, by the radio node, a back off counter associated with an access category relating to the first priority indicator; and
responsive to determining that the back off counter has expired, transmitting, by the radio node, the data packet over the link, the data packet including a MAC protocol data unit (MPDU) with user priority associated with a first priority service.

5. The method of claim 1, further comprising:
determining, by the radio node, that the first link and the second link are in an idle state at a second time;
starting, by the radio node, an independent back off counter for each of the first link and the second link responsive to the determining that each of the first link and the second link are in the idle state; and
responsive to each independent back off counter expiring, transmitting, by the radio node, at least a portion of the data packet over each of the first link and the second link.

6. The method of claim 1, further comprising:
determining, by the radio node, that the first link of the multiple links includes a signal strength measurement that is less than the overlapping basis service set preamble detection threshold and that a third link is greater than the overlapping basis service set preamble detection threshold;
determining, by the radio node, that the second link includes data traffic that does not include any high priority low latency indicators;
starting, by the radio node, a first back off counter for the first link and a second back off counter for the second link; and
responsive to determining that the first back off counter and the second back off counter have expired, transmitting, by the radio node, at least a portion of the data packet over each of the first link and the second link.

7. An apparatus for wireless communication comprising a processor that is configured to cause the apparatus to carry out a method, comprising:

identify a first priority indicator associated with a data packet;

responsive to the identify the first priority indicator associated with the data packet, transmit the data packet on a first available link detected via a multi-link clear channel assessment, wherein transmission of the data packet is prioritized to occur before transmission of another data packet that does not include the first priority indicator;

receive a first message that includes the first priority indicator at a first time;

determine whether each link of multiple links includes a signal strength measurement that is less than an overlapping basis service set preamble detection threshold;

responsive to the determine that each of a first link and a second link of the multiple links includes signal strength measurements that are less than the overlapping basis service set preamble detection threshold, start a back off counter common to each of the first link and the second link; and responsive to a determination that the back off counter has expired, transmit at least a portion of the data packet over each of the first link and the second link, wherein any other communication over the first link and the second link are preempted by the data packet.

8. The apparatus of claim 7,
wherein the first priority indicator is associated with a user priority associated with a first priority service, and
wherein the first priority service allows the apparatus to utilize any access category virtually with an earliest availability via a multi-link assessment, wherein the data packet includes a data frame including a high priority and low latency media access control (MAC) protocol data unit (MPDU).

9. The apparatus of claim 7, wherein the processor is further configured to:
obtain an extremely high throughput (EHT) message that includes the first priority indicator, wherein the first priority indicator is included within a universal signal portion of the EHT message.

10. The apparatus of claim 9, wherein the processor further configures the apparatus to:
determine that a link from the multiple links of a radio node is in an idle state;
responsive to the determine that the link is in the idle state, start a back off counter associated with an access category relating to the first priority indicator; and
responsive to a determination that the back off counter has expired, transmit the data packet over the link, the data packet including a MAC protocol data unit (MPDU) with user priority associated with a first priority service.

11. The apparatus of claim 7, wherein the processor further configures the apparatus to:
determine that the first link and the second link are in an idle state at a second time;
start an independent back off counter for each of the first link and the second link responsive to the determine that each of the first link and the second link are in the idle state; and
responsive to an expiration of each independent back off counter, transmit at least a portion of the data packet over each of the first link and the second link.

12. The apparatus of claim 7, wherein the processor further configures the apparatus to:
receive a first message that includes the first priority indicator at a first time;

determine that the first link of the multiple links includes a signal strength measurement that is less than the overlapping basis service set preamble detection threshold and that a third link is greater than the overlapping basis service set preamble detection threshold;

determine that the second link includes data traffic that does not include any high priority low latency indicators;

start a first back off counter for the first link and a second back off counter for the second link; and responsive to a determination that the first back off counter and the second back off counter have expired, transmit at least a portion of the data packet over each of the first link and the second link.

13. A non-transitory computer readable medium having code stored thereon, the code when executed by a processor, causing the processor to implement a method comprising:

identifying, by a radio node, a first priority indicator associated with a data packet;

responsive to the identifying the first priority indicator associated with the data packet, transmitting, by the radio node, the data packet on a first available link detected via a multi-link clear channel assessment, wherein transmission of the data packet is prioritized to occur before transmission of another data packet that does not include the first priority indicator;

receiving, by the radio node, a first message that includes the first priority indicator at a first time;

determining, by the radio node, whether each link of multiple links includes a signal strength measurement that is less than an overlapping basis service set preamble detection threshold;

responsive to the determining that each of a first link and a second link of the multiple links includes signal strength measurements that are less than the overlapping basis service set preamble detection threshold, starting, by the radio node, a back off counter common to each of the first link and the second link; and responsive to determining that the back off counter has expired, transmitting, by the radio node, at least a portion of the data packet over each of the first link and the second link, wherein any other communication over the first link and the second link are preempted by the data packet.

14. The non-transitory computer readable medium of claim 13, wherein the first priority indicator is associated with a user priority associated with a first priority service, and wherein the first priority service allows the radio node to utilize any access category virtually with an earliest availability via a multi-link assessment, wherein the data packet includes a data frame including a high priority and low latency media access control (MAC) protocol data unit (MPDU).

15. The non-transitory computer readable medium of claim 13, wherein the method further comprises:

obtaining, by the radio node, an extremely high throughput (EHT) message that includes the first priority indicator, wherein the first priority indicator is included within a universal signal portion of the EHT message.

16. The non-transitory computer readable medium of claim 15, wherein the method further comprises:

determining, by the radio node, that a link from the multiple links of the radio node is in an idle state;

responsive to the determining that the link is in the idle state, starting, by the radio node, a back off counter associated with an access category relating to the first priority indicator; and responsive to determining that the back off counter has expired, transmitting, by the radio node, the data packet over the link, the data packet including a MAC protocol data unit (MPDU) with user priority associated with a first priority service.

17. The non-transitory computer readable medium of claim 13, wherein the method further comprises:

determining, by the radio node, that the first link and the second link are in an idle state at a second time;

starting, by the radio node, an independent back off counter for each of the first link and the second link responsive to the determining that each of the first link and the second link are in the idle state; and responsive to each independent back off counter expiring, transmitting, by the radio node, at least a portion of the data packet over each of the first link and the second link.

18. The non-transitory computer readable medium of claim 13, wherein the method further comprises:

determining, by the radio node, that the first link of the multiple links includes a signal strength measurement that is less than the overlapping basis service set preamble detection threshold and that a third link is greater than the overlapping basis service set preamble detection threshold;

determining, by the radio node, that the second link includes data traffic that does not include any high priority low latency indicators;

starting, by the radio node, a first back off counter for the first link and a second back off counter for the second link; and responsive to determining that the first back off counter and the second back off counter have expired, transmitting, by the radio node, at least a portion of the data packet over each of the first link and the second link.

* * * * *

UNITED STATES PATENT AND TRADEMARK OFFICE
CERTIFICATE OF CORRECTION

| | | |
|---|---|---|
| PATENT NO. | : 12,108,465 B2 | |
| APPLICATION NO. | : 17/647567 | |
| DATED | : October 1, 2024 | |
| INVENTOR(S) | : Yonggang Fang et al. | |

It is certified that error appears in the above-identified patent and that said Letters Patent is hereby corrected as shown below:

In the Claims
In Column 22, Lines 65-67, in Claim 12, delete "apparatus to:
receive a first message that includes the first priority indicator at a first time;" and insert
--apparatus to:--

Signed and Sealed this
Nineteenth Day of November, 2024

Katherine Kelly Vidal
*Director of the United States Patent and Trademark Office*